(12) United States Patent
Hansen et al.

(10) Patent No.: US 6,243,199 B1
(45) Date of Patent: Jun. 5, 2001

(54) BROAD BAND WIRE GRID POLARIZING BEAM SPLITTER FOR USE IN THE VISIBLE WAVELENGTH REGION

(75) Inventors: Douglas P. Hansen, Spanish Fork; Raymond T. Perkins, Orem; Eric Gardner, Provo, all of UT (US)

(73) Assignee: Moxtek, Orem, UT (US)

( * ) Notice: Subject to any disclaimer, the term of this patent is extended or adjusted under 35 U.S.C. 154(b) by 0 days.

(21) Appl. No.: 09/390,833

(22) Filed: Sep. 7, 1999

(51) Int. Cl.$^7$ .................................................. G02B 27/28
(52) U.S. Cl. ......................... 359/486; 359/483; 359/900
(58) Field of Search .................................. 359/483, 485, 359/486, 900

(56) References Cited

U.S. PATENT DOCUMENTS

| 2,224,214 | 12/1940 | Brown . |
| 2,287,598 | 6/1942 | Brown . |
| 2,748,659 | 6/1956 | Geffcken et al. . |
| 2,887,566 | 5/1959 | Marks . |
| 3,046,839 | * 7/1962 | Bird et al. ............................ 359/483 |

(List continued on next page.)

FOREIGN PATENT DOCUMENTS

| 416157 | 7/1925 | (DE) . |
| 296391 | 2/1950 | (DE) . |
| 3707984A1 | 3/1987 | (DE) . |
| 0317910A1 | 11/1987 | (EP) . |
| 0349144B1 | 6/1988 | (EP) . |
| 0349309B1 | 6/1988 | (EP) . |
| 0336334B1 | 8/1988 | (EP) . |
| 0357946B1 | 8/1988 | (EP) . |
| 0407830A2 | 7/1989 | (EP) . |
| 0407830B1 | 7/1989 | (EP) . |

(List continued on next page.)

OTHER PUBLICATIONS

Lloyd William Taylor Manual of Advanced Undergraduate Experiments in Physics, p. 302 (1959).

Flanders, Applications of = 100 Å linewidth structures fabricated by shadowing techniques$^{a)}$, J. Vac. Sci. Technol., 19(4), Nov./Dec. 1981 pp. 892–896.

Kuta and van Driel, "Coupled–wave analysis of lamellar metal transmission gratings for the visible and the infrared," J. Opt. Soc. Am. A/vol. 12, No. 5 May 1995 pp. 1118–1127.

Lockbihler and Depine, "Diffraction from highly conducting wire gratings of arbitrary cross–section," Jornal of Modern Optics, 1993, vol. 40, No. 7, pp. 1273–1298.

Novak et al., "Far infrared polarizing grids for use at cryogenic temperatures," Applied Optics, Aug. 15, 1989/vol. 28, No. 15, pp. 3425–3427.

Auton and Hutley, "Grid Polarizers for Use in the Near Infrared," Infrared Physics, 1972, vol, 12, pp. 95–100.

Stenkamp et al, "Grid polarizer for the visible spectral region," SPIE vol. 2213 pp. 288–296, Jul. 1994.

Handbook of Optics, 1978, pp. 10–68—10–77, Optical Society of America.

(List continued on next page.)

*Primary Examiner*—Cassandra Spyrou
*Assistant Examiner*—John Juba, Jr.
(74) *Attorney, Agent, or Firm*—Thorpe North & Western, LLP

(57) ABSTRACT

A wire grid polarizing beam splitter has a generally parallel arrangement of thin, elongated elements which interact with electromagnetic waves of a source light beam to generally transmit or pass light of one polarization, and reflect light of the other polarization. The arrangement of elements has a throughput greater than approximately 50%, and an extinction greater than approximately 100. In addition, the arrangement of elements has a period less than approximately 0.21 μm, and a width to period ratio of between approximately 0.25 to 0.76. The elements have a thickness of between approximately 0.05 to 0.5 μm.

46 Claims, 24 Drawing Sheets

U.S. PATENT DOCUMENTS

| | | | |
|---|---|---|---|
| 3,436,143 | 4/1969 | Garrett . | |
| 3,479,168 | 11/1969 | Bird et al. . | |
| 3,536,373 | 10/1970 | Bird et al. . | |
| 3,566,099 | 2/1971 | Makas . | |
| 3,631,288 | 12/1971 | Rogers . | |
| 3,857,627 | 12/1974 | Harsch . | |
| 3,876,285 | 4/1975 | Schwarzmüller . | |
| 3,912,369 | 10/1975 | Kashnow . | |
| 3,969,545 | 7/1976 | Slocum . | |
| 4,009,933 | 3/1977 | Firester . | |
| 4,025,164 | 5/1977 | Doriguzzi et al. . | |
| 4,025,688 | 5/1977 | Nagy et al. . | |
| 4,049,944 | 9/1977 | Garvin et al. . | |
| 4,073,571 | 2/1978 | Grinberg et al. . | |
| 4,181,756 | 1/1980 | Fergason . | |
| 4,220,705 | 9/1980 | Sugibuchi et al. . | |
| 4,221,464 | 9/1980 | Pedinoff et al. . | |
| 4,268,127 | 5/1981 | Oshima et al. . | |
| 4,289,381 | 9/1981 | Garvin et al. . | |
| 4,456,515 | 6/1984 | Krueger et al. . | |
| 4,466,704 | 8/1984 | Schuler et al. . | |
| 4,512,638 | 4/1985 | Sriram et al. . | |
| 4,514,479 | 4/1985 | Ferrante . | |
| 4,515,441 | 5/1985 | Wentz . | |
| 4,688,897 | 8/1987 | Grinberg et al. . | |
| 4,711,530 | 12/1987 | Nakanowatari et al. . | |
| 4,743,092 | 5/1988 | Pistor . | |
| 4,759,611 | 7/1988 | Downey, Jr. . | |
| 4,759,612 | 7/1988 | Nakatsuka et al. . | |
| 4,799,776 | 1/1989 | Yamazaki et al. . | |
| 4,818,076 | 4/1989 | Heppke et al. . | |
| 4,865,670 | 9/1989 | Marks . | |
| 4,895,769 | 1/1990 | Land et al. . | |
| 4,913,529 | 4/1990 | Goldenberg et al. . | |
| 4,946,231 | 8/1990 | Pistor . | |
| 4,966,438 | 10/1990 | Mouchart et al. . | |
| 4,991,937 | 2/1991 | Urino . | |
| 5,029,988 | 7/1991 | Urino . | |
| 5,061,050 | 10/1991 | Ogura | 359/490 |
| 5,087,985 | 2/1992 | Kitaura et al. | 359/490 |
| 5,113,285 | 5/1992 | Franklin et al. | 359/497 |
| 5,122,887 | 6/1992 | Mathewson . | |
| 5,122,907 | 6/1992 | Slocum | 359/486 |
| 5,139,340 | 8/1992 | Okumura . | |
| 5,157,526 | 10/1992 | Kondo et al. | 359/487 |
| 5,177,635 | 1/1993 | Keilmann | 359/486 |
| 5,225,920 | 7/1993 | Kasazumi et al. . | |
| 5,235,443 | 8/1993 | Barnik et al. . | |
| 5,235,449 | 8/1993 | Imazeki et al. | 359/485 |
| 5,239,322 | 8/1993 | Takanashi et al. | 353/31 |
| 5,245,471 | 9/1993 | Iwatsuka et al. | 359/494 |
| 5,295,009 | 3/1994 | Barnik et al. . | |
| 5,305,143 | 4/1994 | Taga et al. | 359/488 |
| 5,325,218 | 6/1994 | Willet et al. | 353/122 |
| 5,333,072 | 7/1994 | Willet . | |
| 5,357,370 | 10/1994 | Miyatake et al. | 359/495 |
| 5,383,053 * | 1/1995 | Hegg et al. | 359/486 |
| 5,422,756 | 6/1995 | Weber | 359/487 |
| 5,436,761 | 7/1995 | Kamon | 359/487 |
| 5,486,935 | 1/1996 | Kalmanash . | |
| 5,486,949 | 1/1996 | Schrenk et al. | 359/498 |
| 5,490,003 | 2/1996 | Van Sprang . | |
| 5,506,704 | 4/1996 | Broer et al. | 359/500 |
| 5,508,830 | 4/1996 | Imoto et al. . | |
| 5,513,023 | 4/1996 | Fritz et al. . | |
| 5,513,035 | 4/1996 | Miyatake et al. | 359/487 |
| 5,517,356 | 5/1996 | Araujo et al. | 359/490 |
| 5,557,343 | 9/1996 | Yamagishi | 348/781 |
| 5,559,634 | 9/1996 | Weber | 359/487 |
| 5,570,215 | 10/1996 | Omae et al. . | |
| 5,574,580 | 11/1996 | Ansley . | |
| 5,579,138 | 11/1996 | Sannohe et al. | 359/583 |
| 5,594,561 | 1/1997 | Blanchard | 349/112 |
| 5,612,820 | 3/1997 | Schrenk et al. | 359/498 |
| 5,619,356 | 4/1997 | Kozo et al. | 349/99 |
| 5,626,408 | 5/1997 | Heynderickx et al. | 359/495 |
| 5,748,368 * | 5/1998 | Tamada et al. | 359/485 |
| 5,748,369 | 5/1998 | Yokota | 359/487 |
| 5,833,360 | 11/1998 | Knox et al. | 362/19 |
| 6,081,376 * | 6/2000 | Hansen et al. | 359/483 |

FOREIGN PATENT DOCUMENTS

| | | | |
|---|---|---|---|
| 0416157A1 | 9/1989 | (EP) . | |
| 0488544A1 | 11/1990 | (EP) . | |
| 0507445A2 | 3/1991 | (EP) . | |
| 0518111A1 | 5/1991 | (EP) . | |
| 0588937B1 | 6/1991 | (EP) . | |
| 0521591B1 | 7/1991 | (EP) . | |
| 0543061A1 | 11/1991 | (EP) . | |
| 0606940A2 | 1/1993 | (EP) . | |
| 0634674A2 | 6/1993 | (EP) . | |
| 0670506A1 | 9/1993 | (EP) . | |
| 0744634A2 | 5/1995 | (EP) . | |
| 0084502 | 8/1989 | (JP) . | |
| 0084502 * | 4/1991 | (JP) | 359/486 |
| 1781659A1 | 10/1990 | (SU) . | |

OTHER PUBLICATIONS

Handbook of Optics vol. II, $2^{nd}$ Edition, pp. 3.32–3.35 Optical Society of America.

Glytsis and Gaylord, "High–spatial–frequency binary and multilevel stairstep gratings: polarization–selective mirrors and broadband antireflection surfaces," Applied Optics 1 Aug. 1992 vol. 31, No. 22, pp. 4459–4470.

Auton, "Infrared Transmission Polarizers by Photolithography," Applied Optics Jun. 1967 vol. 67, No. 6, pp. 1023–1027.

Haggans et al., "Lamellar gratings as polarization components for specularly reflected beams," Journal of Modern Optics, 1993, vol. 40, No. 4, pp. 675–686.

Bird and Parrish, Jr., "The Wire Grid as a Near–Infrared Polarizer," Lasers in Industry, pp. 886–891 (1972).

Optics $9^{th}$ edition, pp. 338–339 (1980), Butterworth (Publishers), Woburn, Mass.

Whitbourn and Douglas, "Phase shifts in transmission line models of thins periodic metal graid," Applied Optics 15 Aug. 1989 vol. 38, No. 15, pp. 3511–3515.

Enger and Case, "Optical elements with ultrahigh spatial–frequency surface corrugations," Applied Optics 15 Oct. 1983, vol. 22, No. 20 pp. 3220–3228.

Knop, "Reflection Grating Polarizer for the Infrared," Optics Communications vol. 26, No. 3, Sep. 1978.

Hass and O'Hara, "Sheet Infrared Transmission Polarizers," Applied Optics Aug. 1965, vol. 4, No. 8 pp. 1027–1031.

Flanders, "Submicrometer periodicity gratins as artificial anisotropic dielectrics," Appl. Phys. Lett. 42 (6), Mar. 15, 1983, pp. 492–494.

Li Li and J.A. Dobrowski, "Visible broadband, wide–angle, thin–film multilayer polarizing beam splitter," Applied Optics 1 May 1996, vol. 35, No. 13, pp. 2221–2224.

Sonek et al., "Ultraviolet grating polarizers," J. Vac. Sci. Technol., 19(4), Nov./Dec. 1981, pp. 921–923.

J. P. Aughton, "Grid Polarisers for use in the Near InfraRed", Infrared Phys., vol. 12, No. 2, pp. 95–100, Dec. 1972.*

* cited by examiner

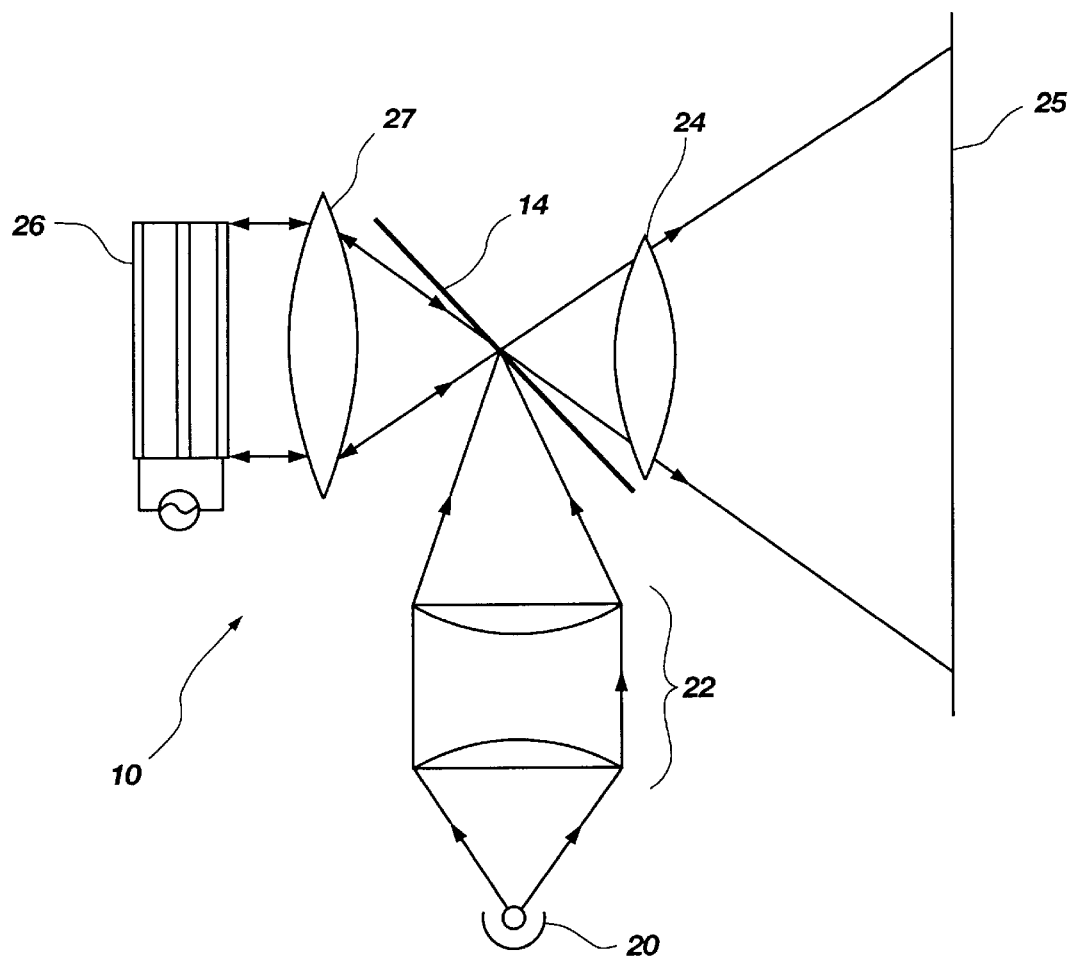
Fig. 1
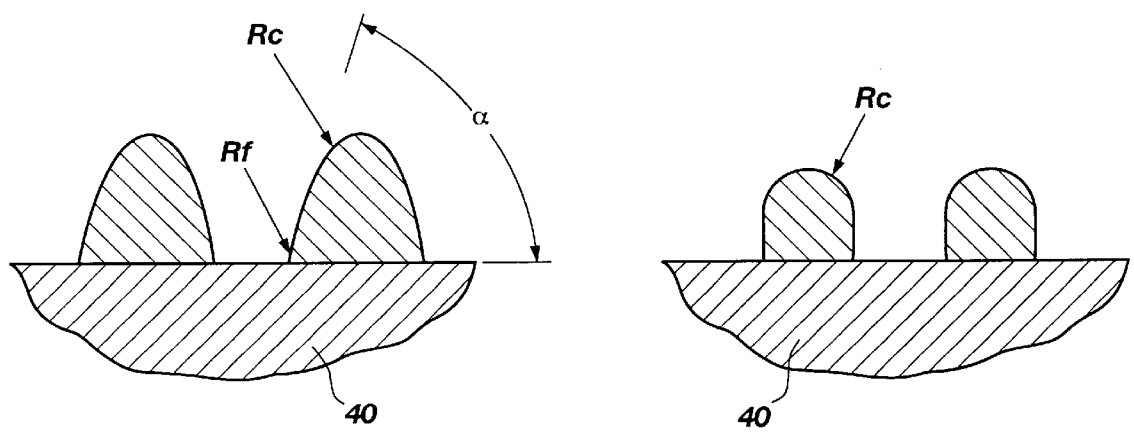
Fig. 2d  Fig. 2c

BROAD BAND WIRE GRID POLARIZING BEAM SPLITTER FOR USE IN THE VISIBLE WAVELENGTH REGION

BACKGROUND OF THE INVENTION

1. Field of the Invention

The present invention relates to a beam splitter operable in the visible spectrum which reflects one linear polarization and transmits the other. More particularly, the present invention relates to such a beam splitter which utilizes a wire grid polarizer as the operative optical element. In addition, the present invention relates to the key parameters of the beam splitter to obtain desirable function throughout the visible spectrum.

2. Prior Art

Wire grid polarizers (WGPs) have been used in polarizing optical systems but have not been effectively applied in beam splitters. For example, wire grid polarizers have been developed which operate in the infrared and longer wavelengths.[1] Structures with grid spacings or periods as fine as 0.115 μm have been reported.[2] Many concepts which enhance the performance of wire grid polarizers have been taught. For example, Garvin[3] and Keilmann[3] teach ways of improving the performance of wire grid polarizers operating in the infrared at normal incidence. As another example, Tamada teaches the concept of using resonance effects in grating structures to produce a narrow spectral band polarizing element that does not require that the grid spacing be much less than the wavelength of the incident light.[5] But a wire grid polarizer that operates over a broad spectral band, e.g. the visible spectrum, requires that the grid spacing be much less than the wavelength of the incident light. One disadvantage with Tamada is that he does not teach a polarizing beam splitter which operates at a given angle and with a given ratio of intensity between the split beams. Tamada, like others, only discusses structures operating near normal incidence.

The concept of using infrared wire grid polarizers at large angles of incidence is occasionally discussed in the literature. For example, Stenkamp measured the transmission of a wire grid polarizer with a period of 100 nm at an angle of incidence of 80°. Stenkamp observed an increase in the extinction ratio at a wavelength of 670 nm. Stenkamp, however, did not measure the reflected radiation intensity, and the data are for only one wavelength.[6] As another example, Bird stated that qualitative tests of the effect of oblique incidence showed that the transmittance of the wire grid was nearly independent of oblique incidence up to 30° off-normal,[7] in agreement with a careful study by Pursley.[8]

The Handbook of Optics states that wire grid polarizers can be used in optical systems with high numerical apertures.[9] Specifically, Young is cited as finding no decrease in the percent of polarization for a mid-IR (12 μm) polarizer used at angles of incidence from 0° to 45° while transmittance decreased by more than 30% (0.55 to less than 0.40).[10]

Key grid parameters that can be used to design polarizing beam splitters include period (p), line width (w), line depth or thickness (t), properties (e.g., index of refraction) of the grating material, properties of the substrate material (e.g., index of refraction), angle of incidence, the wavelength of the incident radiation and grating resonance effects, e.g. the Rayleigh resonance. For example, Haggans studied the effect of these parameters on optical beams reflected from the wire grid.[11] It appears that most of Haggans calculations are for a 45° angle of incidence and transmission is not considered. As another example, Schnable states that changing the metal material is not very useful since there are only a few exceptions where one can increase the polarization effect compared with chromium for a certain wavelength range.[12]

In addition, Haidner describes a polarizing reflection grating polarizer that works only at normal incidence and one wavelength (10.6 μm).[13]

It is desirable to have a wire grid polarizing beam splitter with a high and uniform transmission efficiency across the visible spectrum; a high and uniform reflection efficiency across the visible spectrum; a high transmission and/or reflection extinction across the visible spectrum, a large numerical aperture, e.g., transmission and reflection efficiencies and extinctions must be maintained across an appreciable light cone; and work well with a light cone whose cone angle is as large as 20 to 30°. In order to meet these criteria, a practical design that has uniform performance across the entire visible spectrum must account for and control grating resonance effects such as the Rayleigh resonance. As indicated above, some references discuss some aspects of the grid parameters that affect performance of wire grid polarizers at oblique angles, while other references reveal confusion about the role of these same parameters. None of the references, however, bring together the key concepts necessary to the design of a useful wire grid polarizing beam splitter for imaging applications in the visible spectrum.

The key concepts or physical parameters that must be interrelated and addressed collectively to ensure the desired degree of functionality for a wire grid polarizing beam splitter include: the structure and shape of the grid profile; the height or thickness of the wires or grid elements; orientation of the grid with respect to the polarizations of light; the grid materials; incidence angle; convergence, divergence or cone angle; and the effects of phenomena such as Rayleigh resonance. These concepts must be understood in order to obtain the desired functionality of an effective wire grid polarizing beam splitter.

Therefore, it would be advantageous to develop a beam splitter using a wire grid polarizer for efficiently reflecting one linear polarization and transmitting the other over a broad spectral range. It would also be advantageous to develop such a beam splitter capable of being positioned at a variety of incidence angles so that significant design constraints are not imposed on the optical system, but substantial design flexibility is permitted. It would also be advantageous to develop such a beam splitter which accounts for various important design concepts or parameters, such as wire grid profile, wire grid dimensions, wire grid material, wire grid orientation, wavelength range, incidence angle, cone angle, Rayleigh resonance effects, etc. It would also be advantageous to develop such a beam splitter with a large acceptance angle capable of accepting relatively divergent light.

1. H. Hertz, Electric Waves (Macmillan and Company, Ltd., London, 1893) p.177.; G. R. Bird and M. Parrish, Jr., "The Wire Grid as a Near-Infrared Polarizer," J. Opt. Soc. Am. 50, pp.886–891, 1960.
2. G. J. Sonek, D. K. Wanger, and J. M. Ballantyne, Appl. Opt. 22, pp. 1270–1272, 1983.
3. Garvin, U.S. Pat. No. 4,289,381
4. Keilmann, U.S. Pat. No. 5,177,635
5. Tamada, U.S. Pat. No. 5,748,368; and H. Tamada, et al., "Al wire-grid polarizer using the s-polarization resonance effect at the 0.8-μm-wavelength band," Optics Letters, 22, No. 6, pp. 410–421, 1996)
6. B. Stenkamp, et al., "Grid polarizer for the visible spectral region," SPIE, 2213, pp. 288–296 (1994)

7. G. R. Bird and M. Parrish, Jr., "The Wire Grid as a Near-Infrared Polarizer," J. Opt. Soc. Am., 50, pp. 886–891 (1960)
8. W. K. Pursley, Doctoral thesis, University of Michigan, (1956).
9. Michael Bass, Editor in Chief, The Handbook of Optics, Volume II, p. 3.34, McGraw-Hill, Inc., New York (1995)
10. J. B. Young, et al., Appl. Opt. 4, pp. 1023–1026 (1965)
11. C. W. Haggans, et al., "Lamellar gratings as polarization components for specularly reflected beams," J. Mod. Optics, 40, pp. 675–686 (1993)
12. B. Schnable, et al. "Study on polarizing visible light by subwavelength-period metal-stripe gratings" Opt. Eng. 38(2), pp. 220–226 (1999)
13. H. Haidner, et al., "Polarizing reflection grating beam-splitter for 10.6-µm wavelength," Opt. Eng., 32(8), 1860–1865 (1993)

OBJECTS AND SUMMARY OF THE INVENTION

It is an object of the present invention to provide a beam splitter device operable in the visible spectrum for reflecting one polarization of visible light and transmitting the other.

It is another object of the present invention to provide such a beam splitter device combining various design parameters or concepts, such as wire grid profile, wire grid dimensions, wire grid material, wire grid orientation, wavelength range, incidence angle, cone angle, and Rayleigh resonance effects, in combination to provide for effective and efficient performance.

It is yet another object of the present invention to provide such a beam splitter device capable of being positioned at a variety of incidence angles, permitting increased design flexibility.

It is yet another object of the present invention to provide such a beam splitter device with a large acceptance angle capable of accepting relatively divergent light.

It is a further object of the present invention to provide such a beam splitter device for use in image projection systems, light projection systems, and/or display systems.

These and other objects and advantages of the present invention are realized in a wire-grid polarizing beam splitter having a generally parallel arrangement of thin, elongated elements. The arrangement is configured and the elements are sized to interact with electromagnetic waves of the source light beam to generally transmit or pass light of one polarization, and reflect light of the other polarization. Light having a polarization oriented perpendicular to a plane that includes the elements and the direction of the incident light beam is transmitted, while light having a polarization oriented parallel to the plane that includes at least one of the elements and the direction of the incident light beam is reflected.

The arrangement of elements advantageously has a throughput greater than approximately 50% defined by the product of the fraction of reflected light and the fraction of transmitted light. In addition, the arrangement of elements advantageously has an extinction greater than approximately 50. Thus, the arrangement of elements either reflects at least 67% of one polarization and/or transmits at least 67% of the other polarization. Furthermore, the arrangement of elements advantageously are oriented at an incident angle between approximately 0 to 80 degrees.

The arrangement of elements advantageously has a period less than approximately 0.21 µm, and a width to period ratio of between approximately 0.25 to 0.76. In addition, the elements have a thickness of between approximately 0.04 to 0.5 µm. Furthermore, the elements each have a trapezoidal-shaped cross-section with sides forming an angle with respect to the base between 68 and 112 degrees.

A method for designing and producing a wire grid polarizing beam splitter operable over a desired range of incidence angles with a generally similar performance over the visible spectrum and having a predetermined extinction includes first determining the transmission efficiency for the predetermined upper and lower limits of the incidence angles at various element thicknesses using a lower limit of the visible spectrum. Other critical parameters are selected including at least the period and the width to period ratio. The element thickness is calculated at which the transmission efficiency for the upper and lower limits of the incidence angles is sufficiently the same. The extinction is calculated for the determined element thickness at both the upper and lower limits of the incidence angles. If calculated performance is acceptable, this design is adequate. If calculated performance is not acceptable, the above process is repeated while varying at least one of the parameters until the predetermined extinction is reached. The transmission efficiency may be determined for various different incidence angles within the desired range and for various wavelengths within the visible spectrum. The process may be repeated while varying at least one of the parameters until the desired beam splitter efficiency is achieved, and is generally similar over the visible spectrum.

These and other objects, features, advantages and alternative aspects of the present invention will become apparent to those skilled in the art from a consideration of the following detailed description taken in combination with the accompanying drawings.

DESCRIPTION OF THE DRAWINGS

FIG. 1 is a schematic view of the general operation of a display apparatus using a wire grid polarizing beam splitter of the present invention.

FIG. 2c is a cross sectional side view of an alternative embodiment of a wire grid polarizing beam splitter of the present invention.

FIG. 2d is a cross sectional side view of an alternative embodiment of a wire grid polarizing beam splitter of the present invention.

DETAILED DESCRIPTION OF THE INVENTION

Figure 2A:
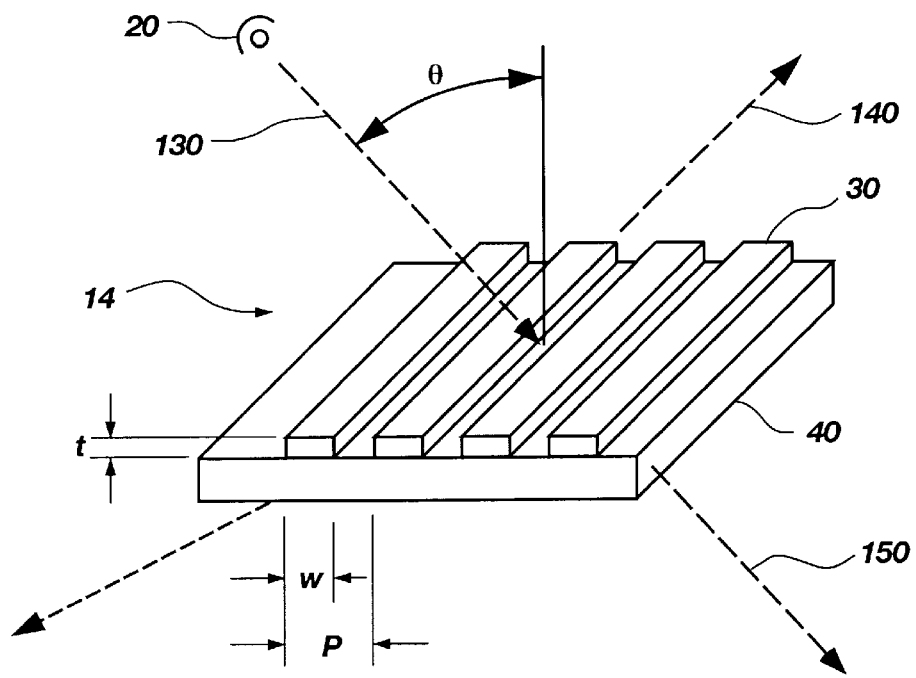
FIG. 2a is a perspective view of a preferred embodiment of the wire grid polarizing beam splitter of the present invention.

Reference will now be made to the drawings in which the various elements of the present invention will be given numerical designations and in which the invention will be discussed so as to enable one skilled in the art to make and use the invention.

The preferred embodiment of a wire grid polarizing beam splitter is suitable for use in optical systems, such as that outlined in FIG. 1. As illustrated in FIG. 1, a display optical train of an image projection system, indicated generally at 10, is shown with a wire grid polarizer as the beam splitter, indicated generally at 14. The image projection system 10 may incorporate a light source 20, light gathering optics 22, the wire-grid polarizing beam splitter 14, the projection optics 24, and a display screen of some type 25, the image generation liquid crystal array or light valve 26, and imaging or relay optics 27. It is of course understood that other arrangements incorporating a wire-grid polarizing beam splitter are possible.

For the optical geometry shown in FIG. 1, the wire-grid PBS 14 must have high reflectivity ($R_s$) for the desired polarization, such as s-polarization, from the light source 20, and it must have high transmissivity ($T_p$) of the opposite polarization, such as p-polarization, from the liquid crystal array 26. The efficiency of the optical system is proportional to the product of these two, $R_s T_p$, so deficiency in one factor can be compensated to some extent by improvement in the other, the goal being to produce the largest product $R_s T_p$, possible. For further discussion, the term throughput will be used to refer to the product $R_s T_p$.

Another important performance factor is contrast in the image, as defined by the ratio of intensities of light to dark pixels. This is governed to a large extent by low leakage of the undesired polarization, but in this case the product of the reflection extinction and the transmission extinction is not the important parameter, because the image generating array 26 which lays in sequence after the first encounter with the beam splitter 14, but before the second, also takes part in the production of the image contrast. Therefore, the final system contrast will depend on the light valve performance as well as the polarizer extinction. It has been found that a reflection and transmission extinction of 50 is a reasonably useful minimum for systems such as those in FIG. 1 which do not have additional polarizer elements.

There are two different functions fulfilled by the beam splitter 14. The first is the preparation of the polarized light before it strikes the liquid crystal array 26, or other suitable image generation device. The requirement here is that the light be sufficiently well polarized that any variations in the polarization of the light beam created by the light valve 26 can be adequately detected or analyzed by the beam splitter 14, such that the final image will meet the desired level of performance. Similarly, the second function of the beam splitter 14 is to analyze light which is directed by the light valve 26 back to the beam splitter 14 so that the desired system contrast performance is achieved.

The wire grid polarizing beam splitter 14 of the preferred embodiment is therefore designed to maximize the throughput ($R_s T_p$) while simultaneously delivering the desired polarization extinction for both the reflected beam R and the transmitted beam T. There are key parameters, or physical characteristics of the invention which are fundamental in achieving this desired performance level, and will be described below with reference to FIGS. 2a and 2b.

Figure 2B:
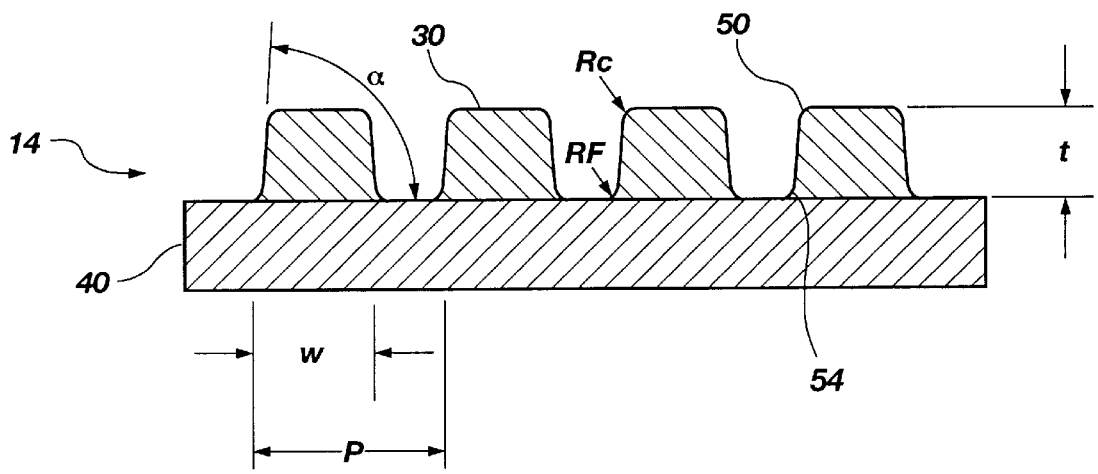
FIG. 2b is a cross sectional side view of a preferred embodiment of the wire grid polarizing beam splitter of the present invention.

Referring to FIGS. 2a and 2b, the polarizing beam splitter 14 has a grid 30, or an array of parallel, conductive elements, disposed on a substrate 40. The polarizing beam splitter 14 is disposed in the light such that the light beam is incident on the grid at an incident angle θ. The key physical parameters of the wire grid beam splitter 14 which must be optimized as a group in order to achieve the level of performance required include: the period p of the wire grid 30, the height or thickness t of the grid elements 30, the width w of the grids elements 30, and the slope of the grid elements sides α.

In addition to producing an array of elongated elements with the proper relationship between these dimensions, it is important to compose the elements of the proper materials with the proper optical properties. For beam splitters which must function across the visible spectrum, aluminum or silver are the preferred materials. It is important that the aluminum or silver used be of the best optical quality. Care must be taken to prepare the aluminum or silver so that it will have optical qualities (such as optical constants n and k) substantially similar to those tabulated in Palik, *Handbook of Optical Constants of Solids, Part I*, Edward D. Palik, Ed., 1985, pp. 350–357 and 369–406, the original sources cited in Palik, or similar data tables. For example, the desired optical constants for silver are n=0.144 and k=2.56 for a wavelength of 459.2 nm; n=0.120 and k=3.45 for a wavelength of 563.6 nm; and n=0.140 and k=4.15 for a wavelength of 652.6 nm. Similarly, for aluminum, appropriate values are n=0.618 and k=5.47 for a wavelength of 450 nm; n=0.958 and k=6.69 for a wavelength of 550 nm; and n=1.47 and k=7.79 for a wavelength of 650 nm. We have found that aluminum is preferred over silver because of its significantly higher k-values. In particular, we have found that the use of aluminum with either or both of n and k that are not above about 50% of these values will significantly increase the difficulty of producing a beam splitter which will function adequately. If silver is used, either or both of the n and k values must be greater than approximately 80% of the values shown above.

It will be noted in examining FIG. 2b that the general cross-section of the grid elements 30 is trapezoidal or rectangular in nature. This general shape is also a feature of the polarizing beam splitter 14 of the preferred embodiment, but allowance is made for the natural small variations due to manufacturing processes, such as the rounding of corners 50 at the top of the grid elements 30, and fillets 54 at the base of the grid elements 30.

It should be noted that the slope of the grid element sides may be different because introducing a different slope on the left side, versus the right side, of the grid element 30 can be used to advantage to help tune the angular performance of the grid 30 by introducing a directional anisotropy into the grid structure. However, this appears to be a secondary effect.

Alternatively, the general cross-section of the grid elements 30 may be smoothly curved, as shown in FIG. 2c, or sinusoidal in nature, as shown in FIG. 2d. For example, the cross-section of the elements 30 may be similar to a portion of a sine curve, as shown in FIG. 2d. Such a curved or sinusoidal cross-section may be formed by extreme rounding of the corners and fillets at the base of the elements. As another example, the top of the elements may be broadly curved, or the corners extremely rounded, as shown in FIG. 2c.

It should also be noted that the period p of the wire grid 30 must be regular in order to achieve the specular reflection performance required to meet the imaging fidelity requirements of the beam splitter 14 of the preferred embodiment. While it is better to have the grid 30 completely regular and uniform, some applications may have relaxed requirements in which this is not as critical. It is believed, however, that a variation in period p of less than 10% across a meaningful dimension in the image, such as the size of a single character in a textual display, or a few pixels in an image, is required to achieve the necessary performance. Of course, non-imaging applications of wire-grid polarizing beam splitters may have a large tolerance for variation in the period p.

Similarly, reasonable variations across the beam splitter 14 in the other parameters described, such as the width w of the grid elements 30, the grid element height t, the slopes α of the sides, or even the corner 50 rounding $R_C$, and the fillet 54 rounding $R_F$, are also possible without materially affecting the display performance, especially if the beam splitter 14 is not at an image plane, as will often be the case. These variations may even be visible in the finished beam splitter 14 as fringes, variations in transmission efficiency, reflection efficiency, color uniformity, etc. and still provide a useful part for specific applications.

The design goals which must be met by the optimization of these parameters is to produce the best throughput $R_s T_p$ possible, while meeting the contrast requirements of the application. As stated above, the minimum extinction required of the polarizing beam splitter 14 is on the order of 50. It has been found that the minimum required throughput $(R_s T_p)$ of the beam splitter 14 in order to have a valuable product is approximately 50%, which means either or both of $R_s$ and $T_p$ must be above about 67%. Of course, higher performance in both the throughput and the extinction of the beam splitter will be of value and provide a better product. In order to understand how these parameters affect the performance of the wire grid beam splitter, it is necessary to examine the variation in performance produced by each parameter.

Figure 3A:
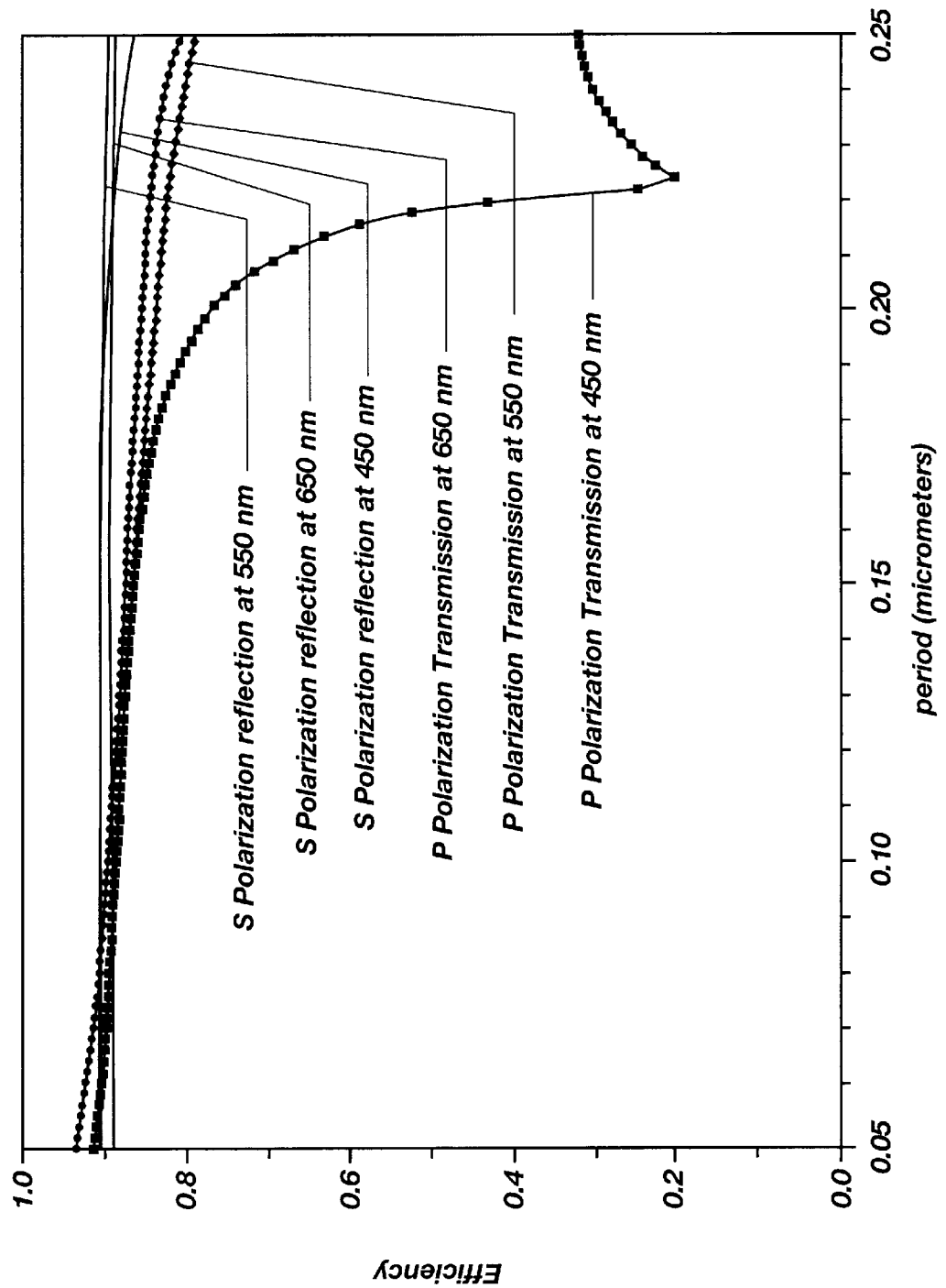
FIG. 3a is a graphical plot showing efficiency of S polarization reflection and P polarization transmission at wavelengths of 450 nm, 550 nm, and 650 nm as a function of the grid period.

Referring to FIGS. 3a–3e, the performance of the wire grid beam splitter 14 is shown with respect to the period p. The grating consists of an array of aluminum wire grid elements with optical constants taken from Paliks on a BK7 glass substrate. The height or thickness t of each aluminum wire grid element is 1,000 Å or 100 nm. The angle of incidence θ is 30°, and the linewidth to period ratio is 0.45. FIG. 3a shows the reflection efficiency of the S-polarization and the transmission efficiency of the P-polarization at wavelengths of 450 nm, 550 nm, and 650 nm as a function of the grating period p.

Figure 3B:
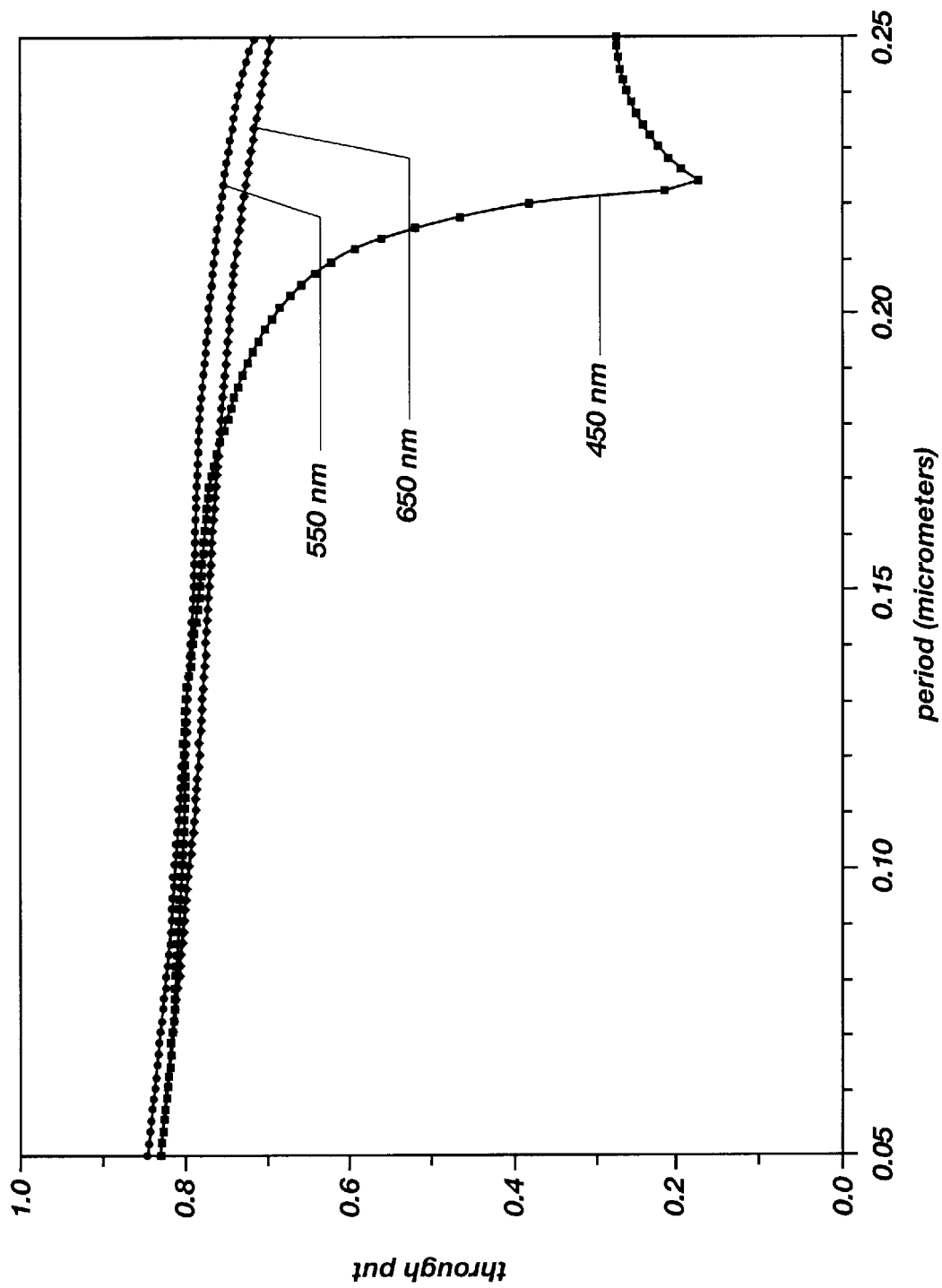
FIG. 3b is a graphical plot showing the throughput ($R_sT_p$) efficiency of the wire-grid beamsplitter as a function of the grid period for 450 nm, 550 nm, and 650 nm.

FIG. 3b shows throughput $(R_s T_p)$ as a function of period p at wavelengths of 450 nm, 550 nm, and 650 nm. The data displayed in FIG. 3b indicates that the period p can be as large as 0.21 μm and still yield a throughput of 50%.

Figure 3C:
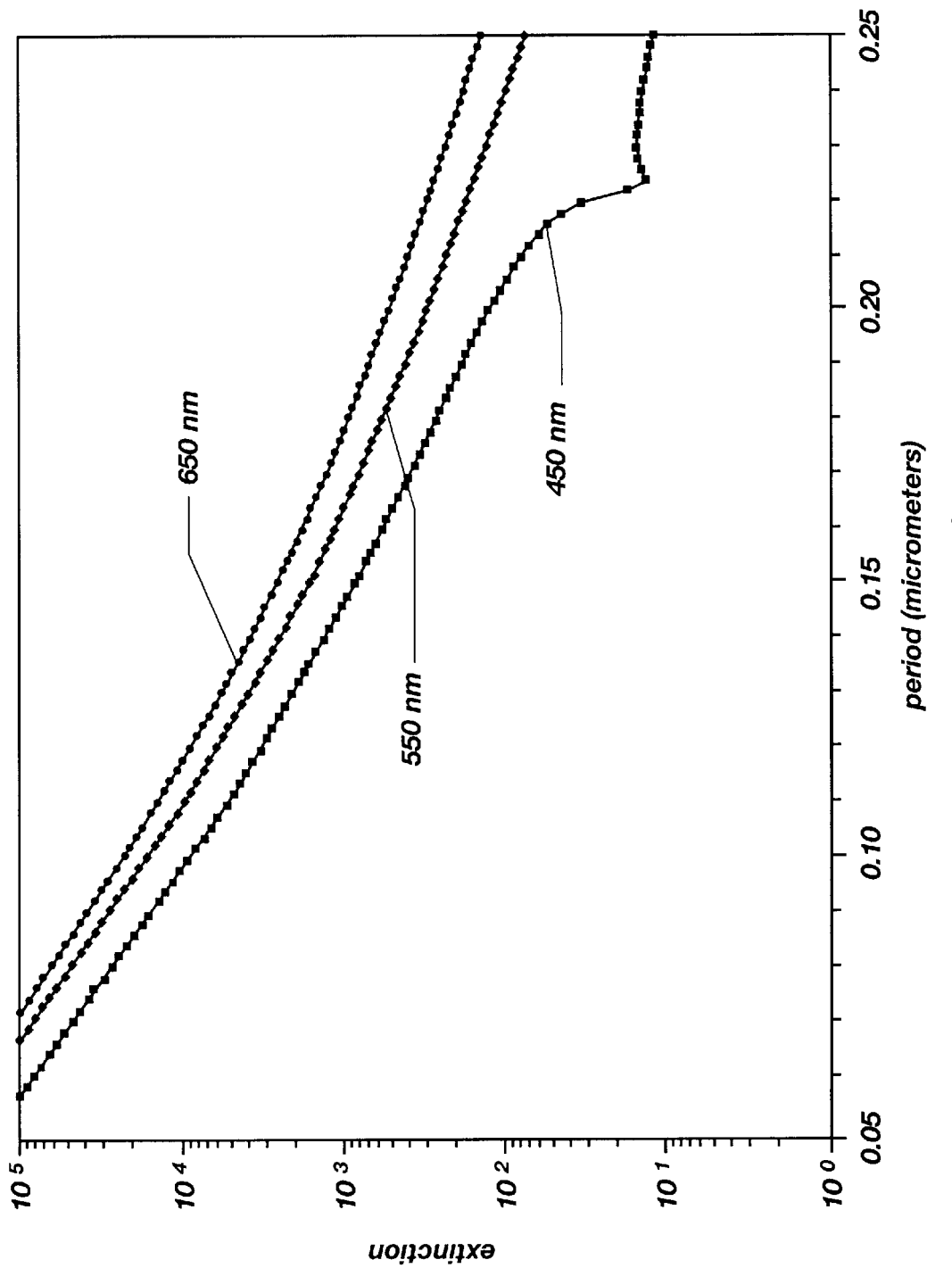
FIG. 3c is a graphical plot showing the extinction of the wire-grid polarizer as a function of the grid period for 450 nm, 550 nm, and 650 nm.

FIG. 3c gives extinction as a function of period p. For the worst case, i.e. the wavelength λ=450 nm, the extinction is greater than 100 with the period p as large as 0.21 μm.

Figure 3D:
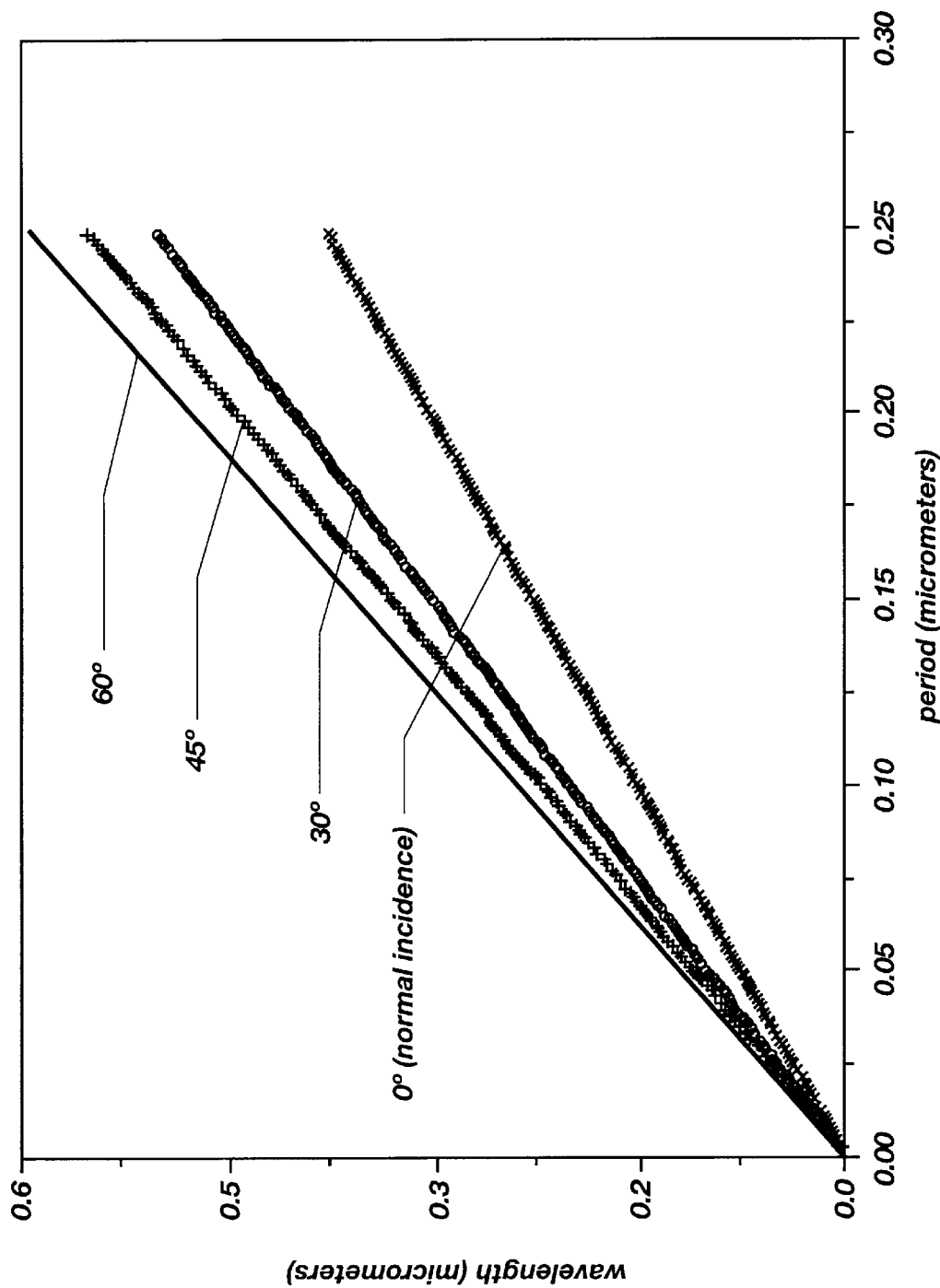
FIG. 3d is a graphical plot showing the wavelength at which Rayleigh's resonance occurs as a function of the grid period for incidence angles of 0°, 30°, 45°, and 60°.

FIG. 3d plots the Rayleigh wavelength, i.e. the wavelength at which a grating resonance occurs ($\lambda = p[n_s \pm \sin \theta]$ with $n_s=1.525$) as a function of period p. Again for an incidence angle θ of 30° and a wavelength λ=450 nm, the period p can be as large as 0.21 μm.

Figure 3E:
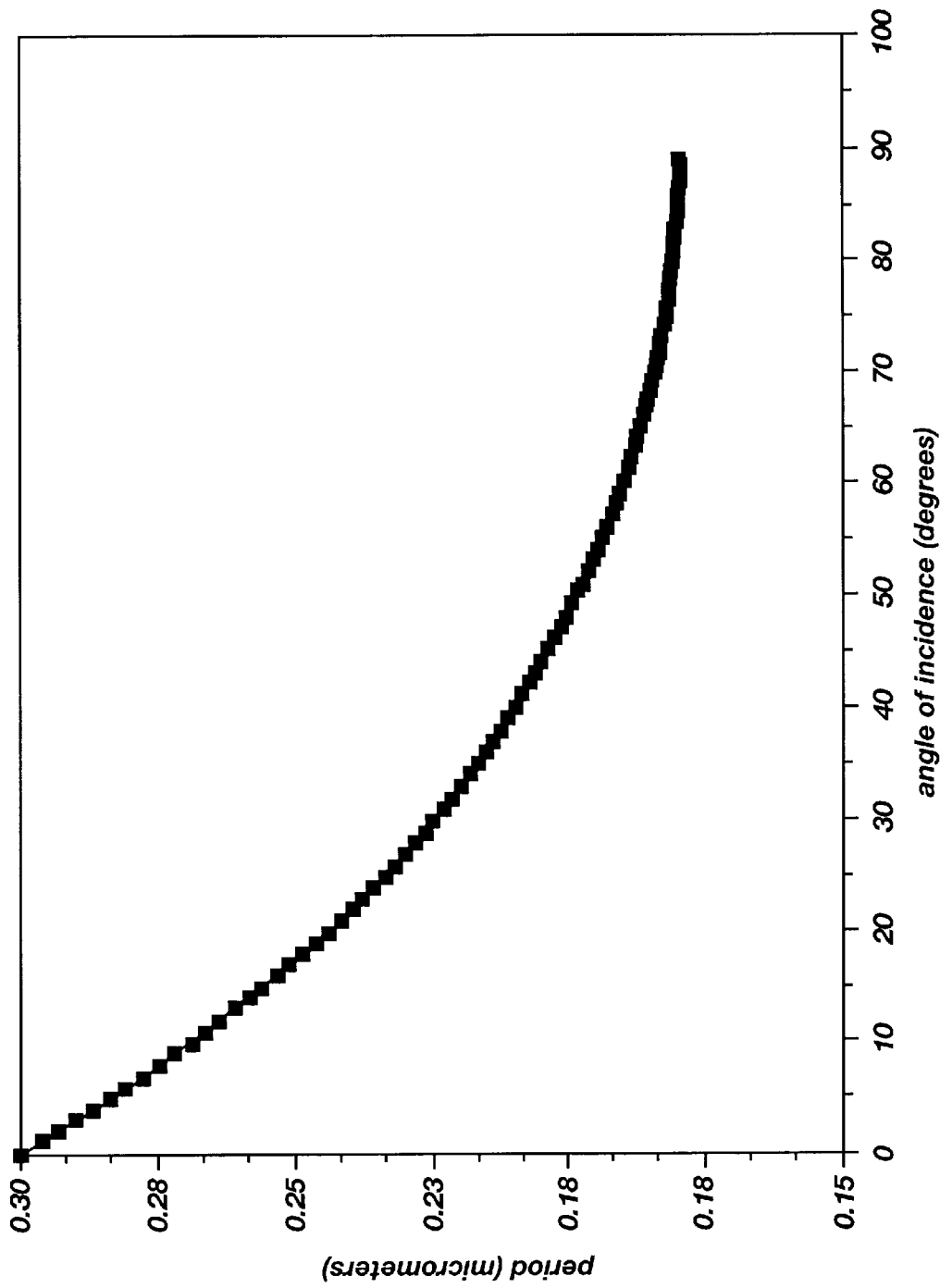
FIG. 3e is a graphical plot showing the maximum useful period based on the onset of Rayleigh's resonance as a function of the angle of incidence.

FIG. 3e shows the allowable period p as a function of the angle of incidence θ. The maximum useful period is based on the onset of Rayleigh's resonance based on the angle of incidence with a wavelength of 450 nm. The curve indicates that the wire grid polarizer can operate at a large angle of incidence with a period of 0.21 μm or less.

Therefore, FIGS. 3a–3e indicate that a wire grid polarizer as defined by the above parameters must have a period p of less than 0.21 μm to produce a beam splitter which has reasonable performance throughout the visible spectrum. It is of course understood that a larger period beam splitter would be useful in systems which are expected to display less than the full visible spectrum, such as just red, red and green, etc.

Figure 4A:
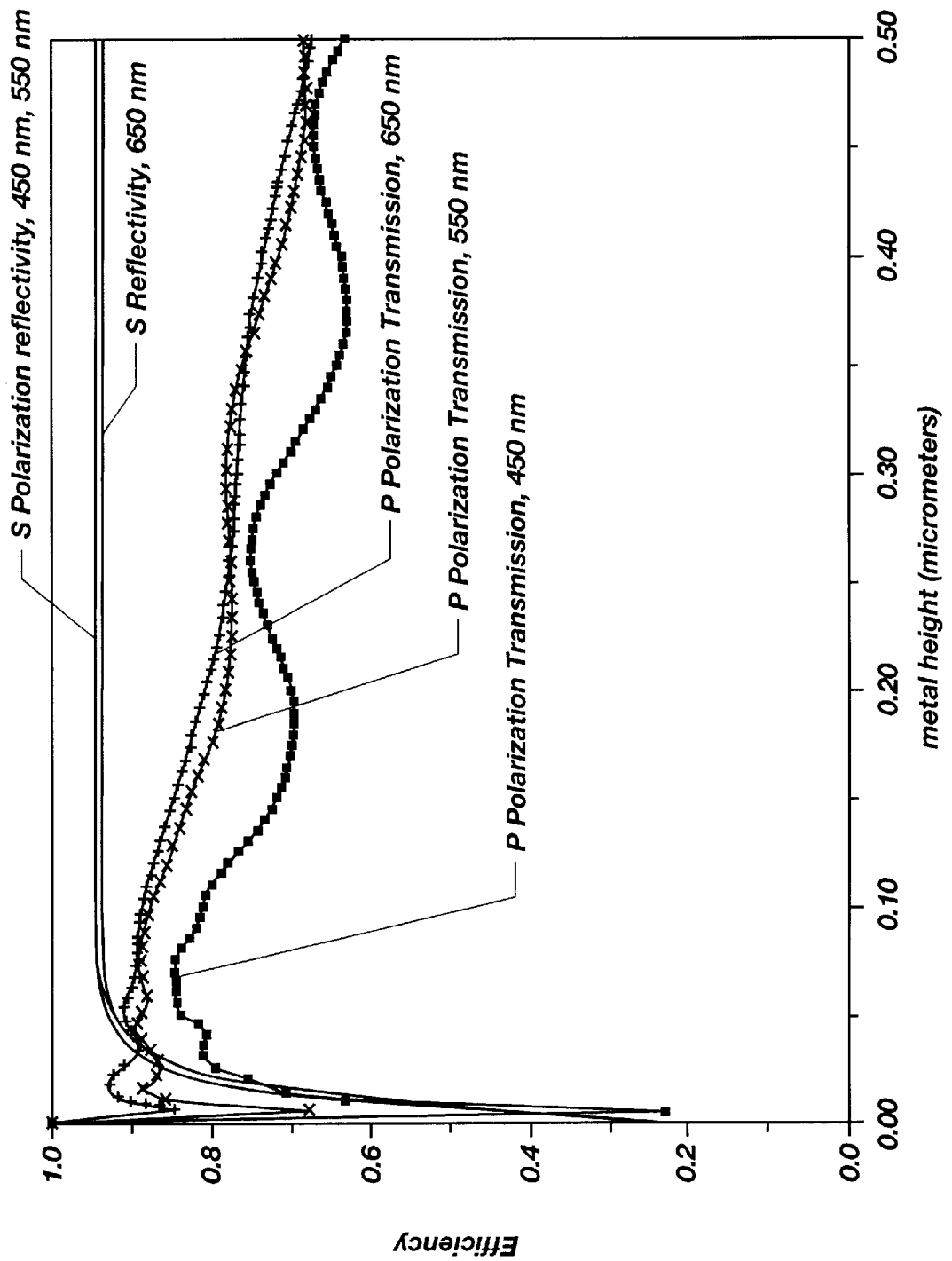
FIG. 4a is a graphical plot showing the efficiencies of P polarization transmission and S polarization reflection as a function of the grid element height for 450 nm, 550 nm, and 650 nm incident light.
Figure 4B:
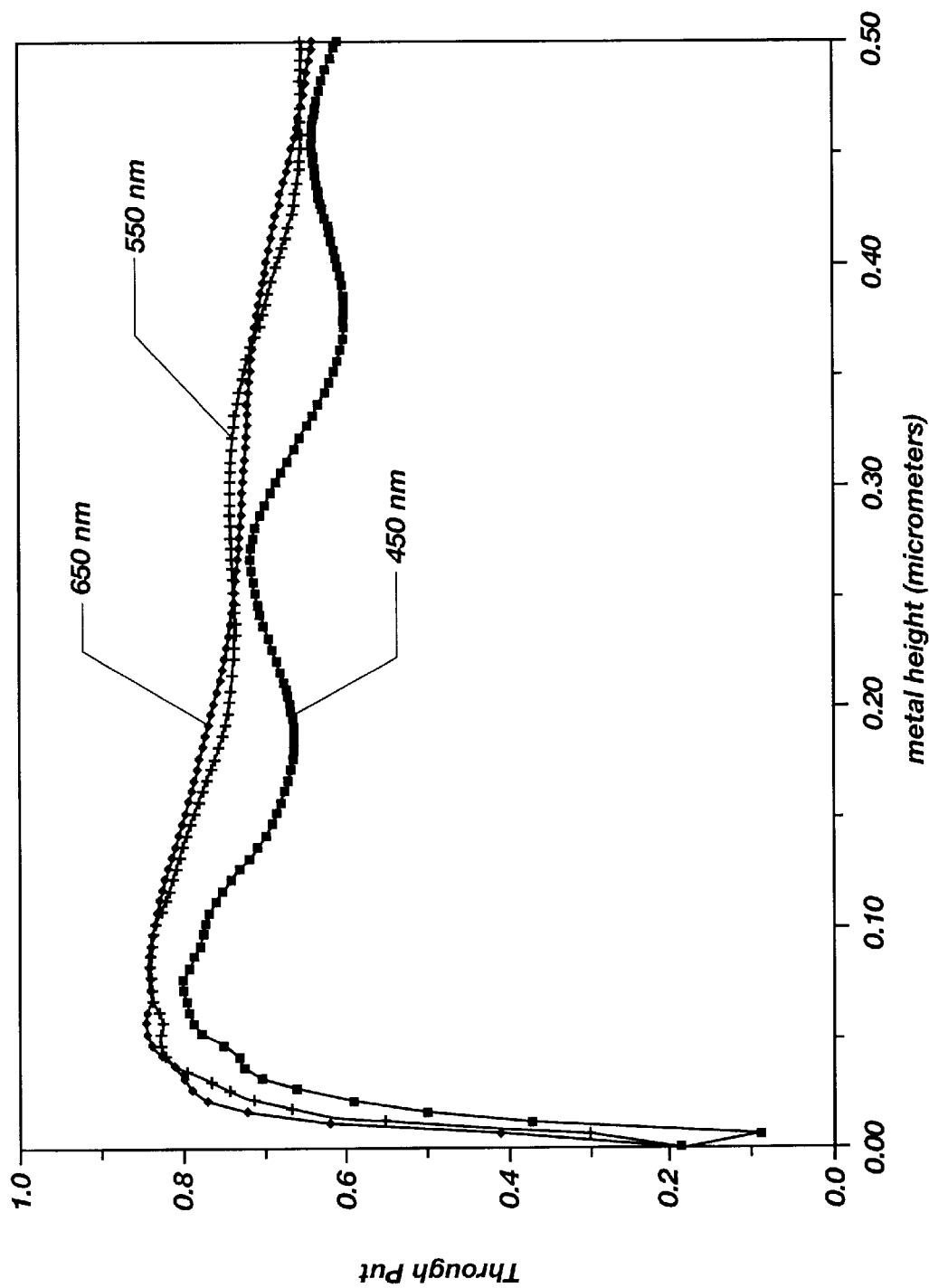
FIG. 4b is a graphical plot showing the throughput ($R_s T_p$) as a function of the grid element height.
Figure 4C:
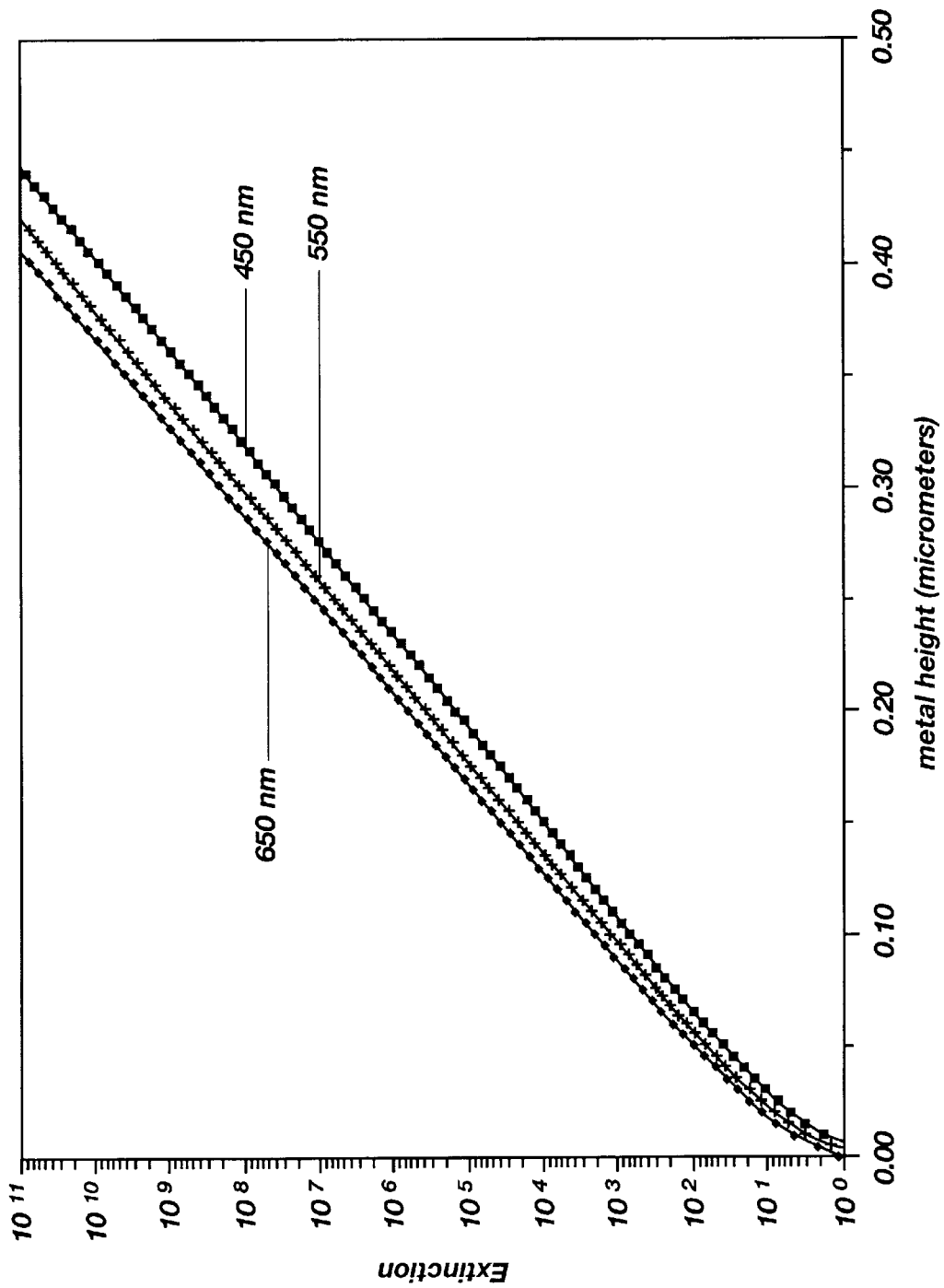
FIG. 4c is a graphical plot showing the extinction of the wire-grid polarizer as a function of the grid element height.

Referring now to FIGS. 4a–4c, the performance of the wire grid beam splitter 14 is shown with respect to the element height or thickness t. The polarizer is an array of aluminum wire grid elements with optical properties taken from Paliks on a BK7 glass substrate. The period is 0.15 μm, the line-space ratio is 0.5, and the angle of incidence θ is 60°.

FIG. 4a is a plot of the reflection efficiency of the S-polarization and the transmission efficiency of the P-polarization as a function of the element height or thickness t at wavelengths of 450 nm, 550 nm, and 650 nm. Thin film effects are apparent in FIG. 4a, but the P-transmission efficiency remains above 60% for all practical element heights, namely 200 Å to 0.5 µm and above. Of course, different results will occur for materials other than aluminum with different optical properties.

FIG. 4b shows throughput as a function of element height or thickness t at wavelengths of 450 nm, 550 nm, and 650 nm. The throughput is greater than 50% for all practical element heights between 200 Å to 0.5 µm, or 20 nm to 500 nm.

FIG. 4c shows extinction as a function of element height at wavelengths of 450 nm, 550 nm, and 650 nm. An extinction of 50 requires an element height t of at least 500 Å, or 50 nm.

Therefore, FIGS. 4a–4c show that the wire-grid element height t must fall between the ranges of 500 Å and 0.5 µm in order to provide the required performance.

Figure 5A:
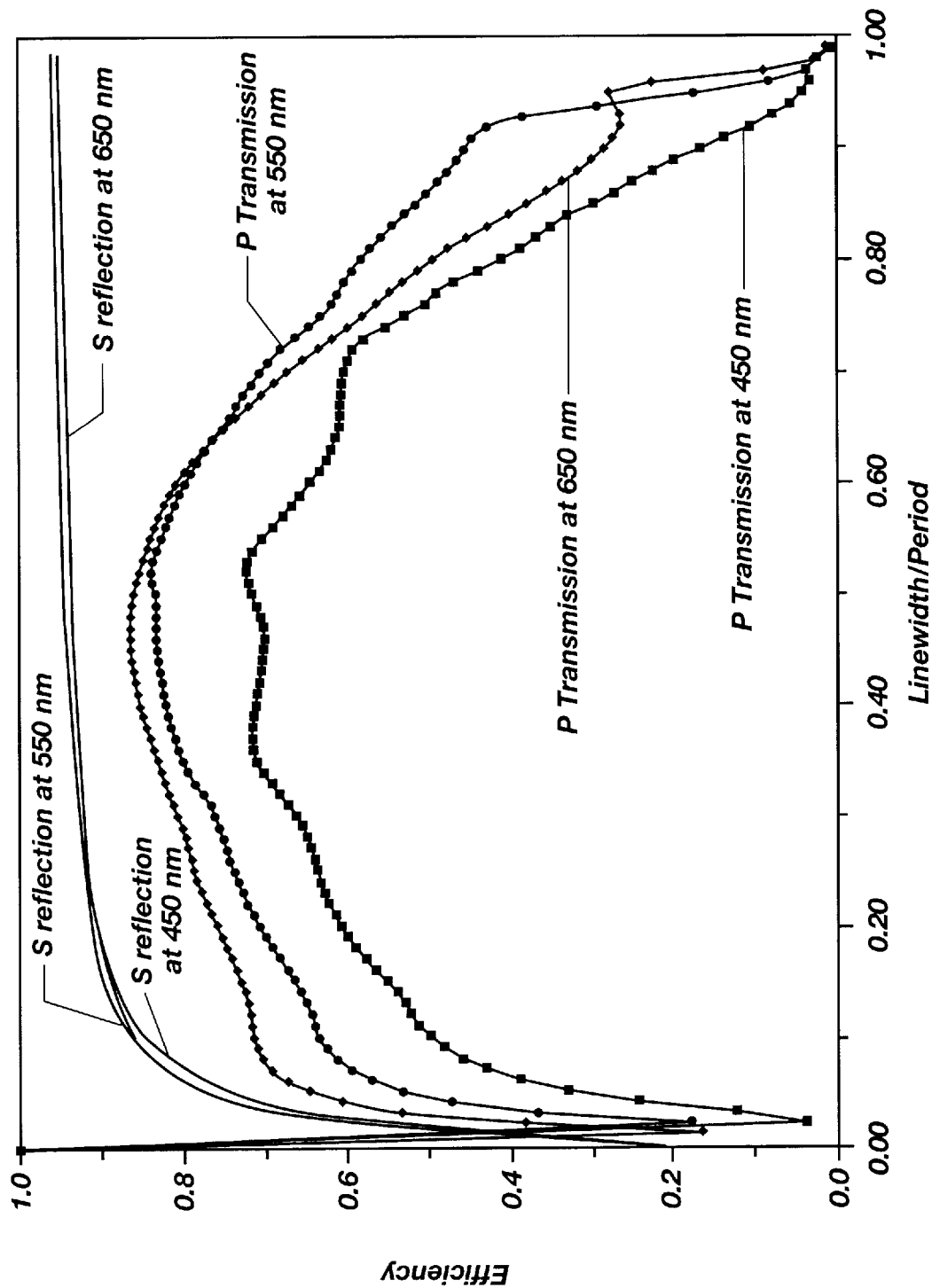
FIG. 5a is a graphical plot showing the S polarization reflection and the P polarization transmission as a function of the width to period ratio or line-space ratio for wavelengths of 450 nm, 550 nm, and 650 nm.
Figure 5B:
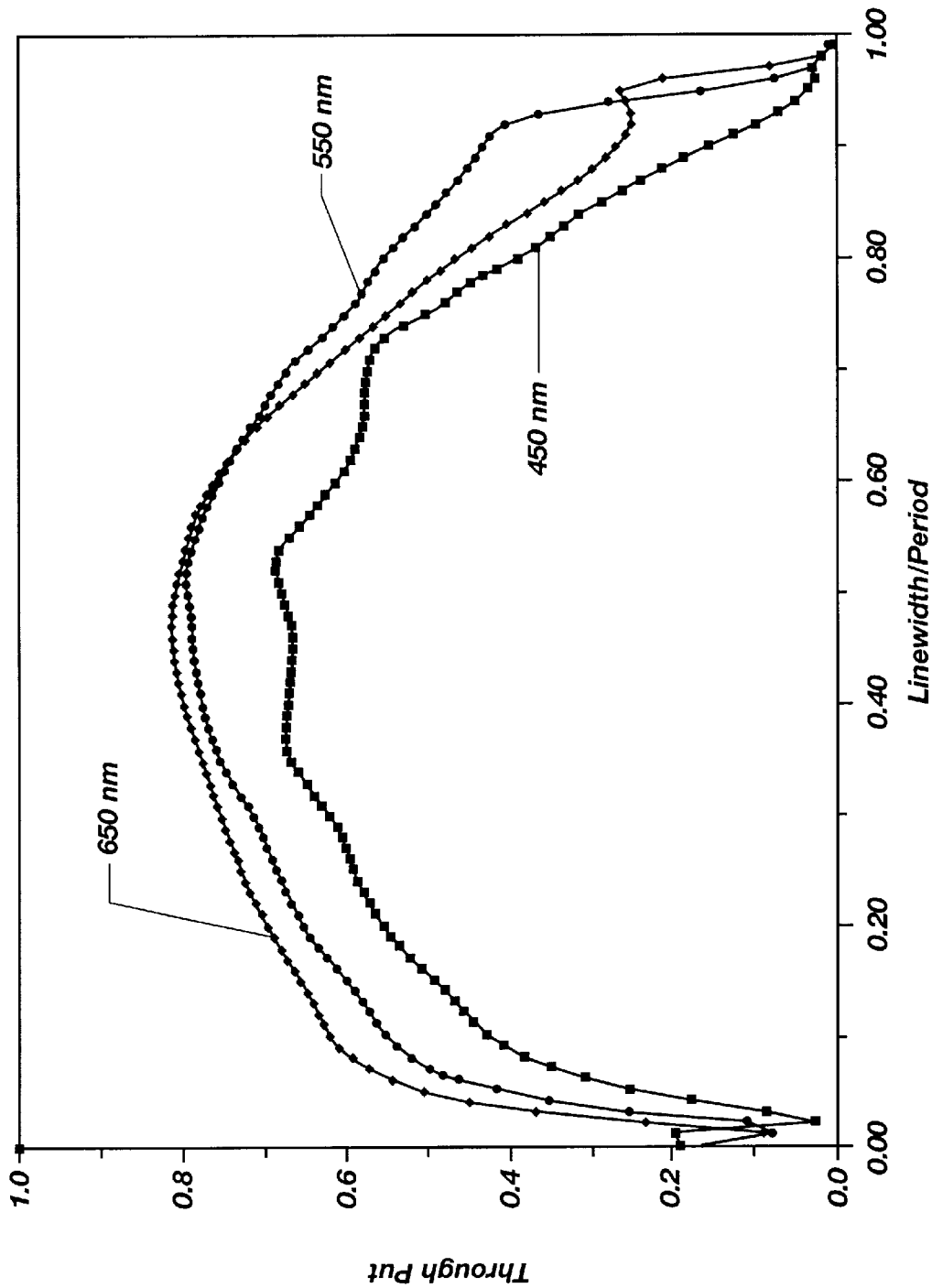
FIG. 5b is a graphical plot showing the throughput ($R_s T_p$) as a function of the width to period ratio or line-space ratio for wavelengths of 450 nm, 550 nm, and 650 nm.
Figure 5C:
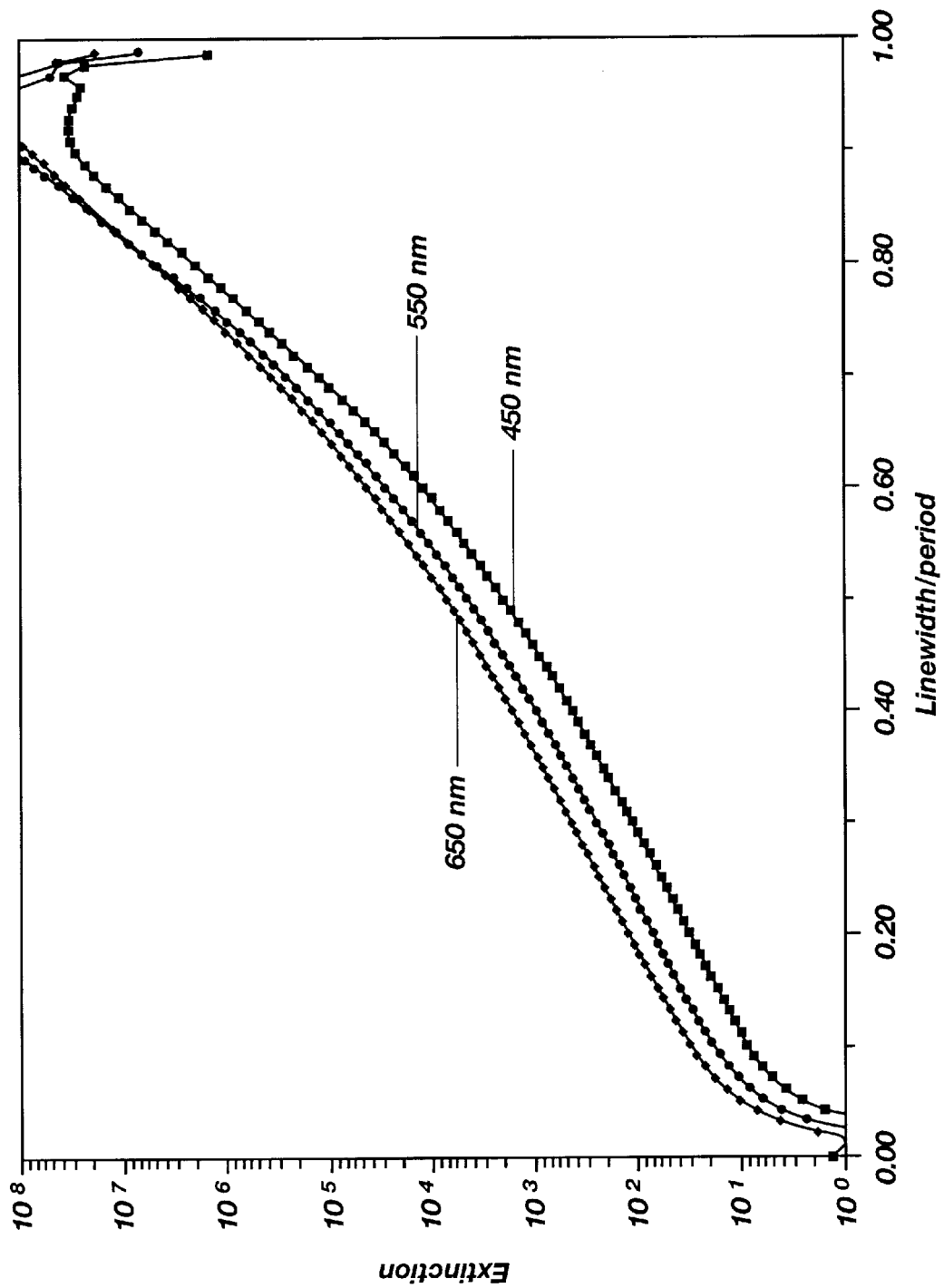
FIG. 5c is a graphical plot showing the extinction as a function of the width to period ratio or line-space ratio for wavelengths of 450 nm, 550 nm, and 650 nm.

Referring now to FIGS. 5a–5c, the performance of the wire grid beam splitter 14 is shown with respect to the line-space ratio. The polarizer is an array of aluminum wire grid elements with optical properties taken from Paliks on a BK7 glass substrate. The period p is 0.16 µm; the aluminum element height t is 0.13 µm, and the angle of incidence θ is 60°.

FIG. 5a is a plot of the reflection efficiency of the S-polarization and the transmission efficiency of the P-polarization as a function of the linewidth to period ratio (w/p) at wavelengths of 450 nm, 550 nm, and 650 nm. The P-transmission efficiency remains high for a line-space ratio between 0.16 and 0.76.

FIG. 5b shows throughput as a function of linewidth to period ratio for wavelengths of 450 nm, 550 nm, and 650 nm. Good throughput performance is achieved for a linewidth to period ratio between 0.16 and 0.76.

FIG. 5c gives extinction as a function of linewidth to period ratio for wavelengths of 450 nm, 550 nm, and 650 nm. An extinction of 50 throughout the visible spectrum requires this ratio to be at least 0.25. Of course, a beam splitter to be used over larger wavelengths only (red, red-green) may have a ratio less than 0.20.

Therefore, FIGS. 5a–5c indicate that the linewidth to period ratio (w/p) must fall between the ranges of 0.25 and 0.76 in order to provide the required performance.

Figure 6A:
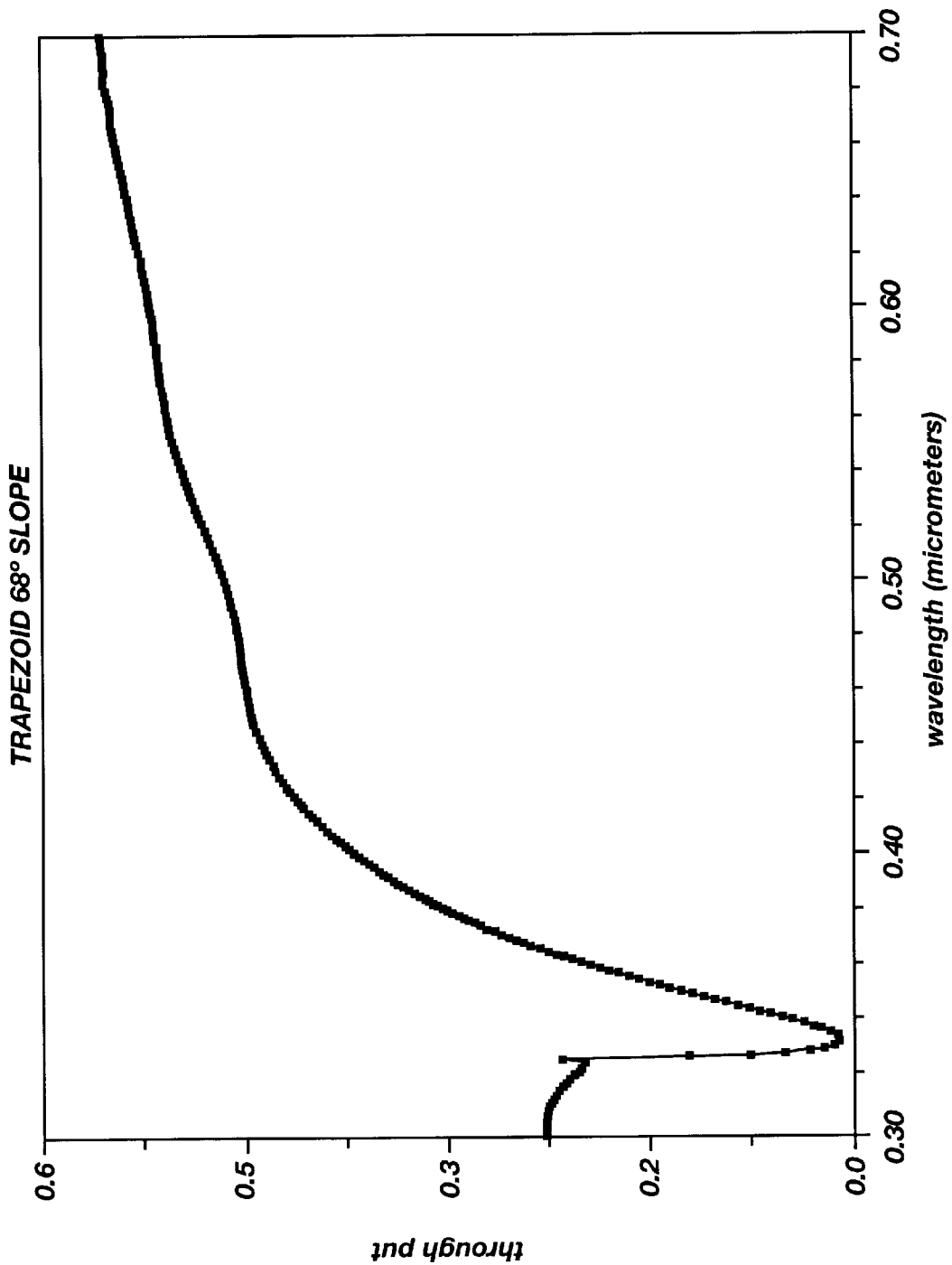
FIG. 6a is a graphical plot showing the throughput ($R_s T_p$) as a function of wavelength for a wire-grid polarizer with trapezoidal grid elements.
Figure 6B:
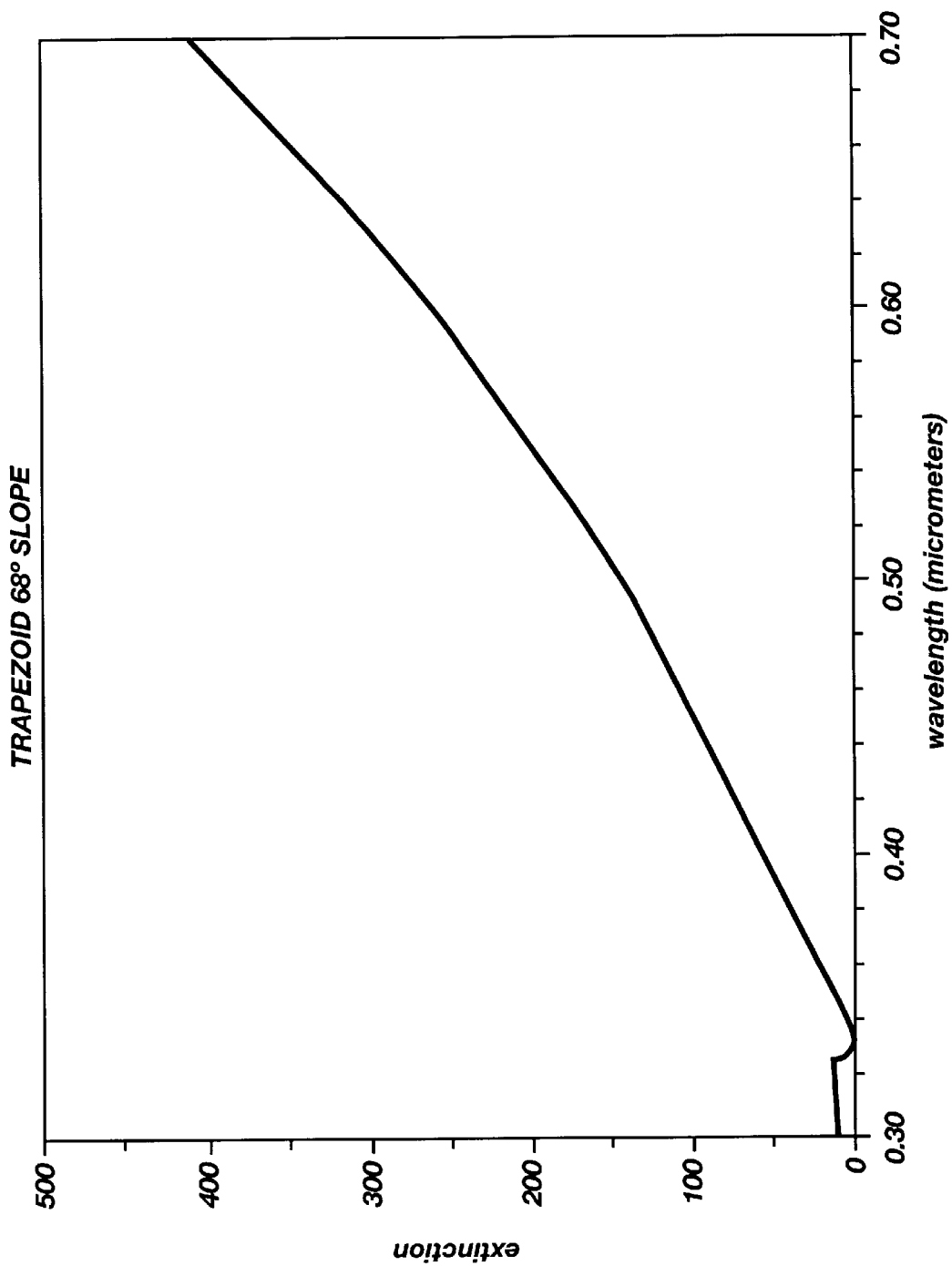
FIG. 6b is a graphical plot showing the extinction as a function of wavelength for a wire-grid polarizer with trapezoidal grid elements.

Referring now to FIGS. 6a and 6b, the performance of the wire grid beam splitter 14 is shown with respect to the cross sectional shape of the elements, namely a trapezoidal cross-section. The polarizer represented in these figures is an array of aluminum wire grid elements with optical properties taken from Palik on a BK7 glass substrate. The period p is 0.16 µm, the angle of incidence θ is 45°, and the height t of the trapezoidal elements are 1,000 Å. The cross sectional area of the wire grid element is the same as for a rectangular wire grid element with a line-space ratio of 0.45.

FIG. 6a shows the throughput for a wire grid array consisting of elements with a trapezoidal cross-section with side walls which make an angle of 68° with respect to the substrate as a function of wavelength λ. Throughput greater than 50% will occur for all wavelengths λ greater than or equal to 415 nm.

FIG. 6b gives extinction for a wire grid array consisting of element with a trapezoidal cross-section with side walls which make an angle of 68° with respect to the substrate as a function of wavelength λ. All wavelengths greater than or equal to 390 nm will have an extinction greater than 50.

Therefore, as shown in FIGS. 6a and 6b, a wire grid element with a trapezoidal cross-section that has a slope angle as low as 68° will provide the required performance. The angle can be from 112°, through 90° (rectangle), to 68° without degrading performance substantially from that shown in FIGS. 6a and 6b.

Figure 7A:
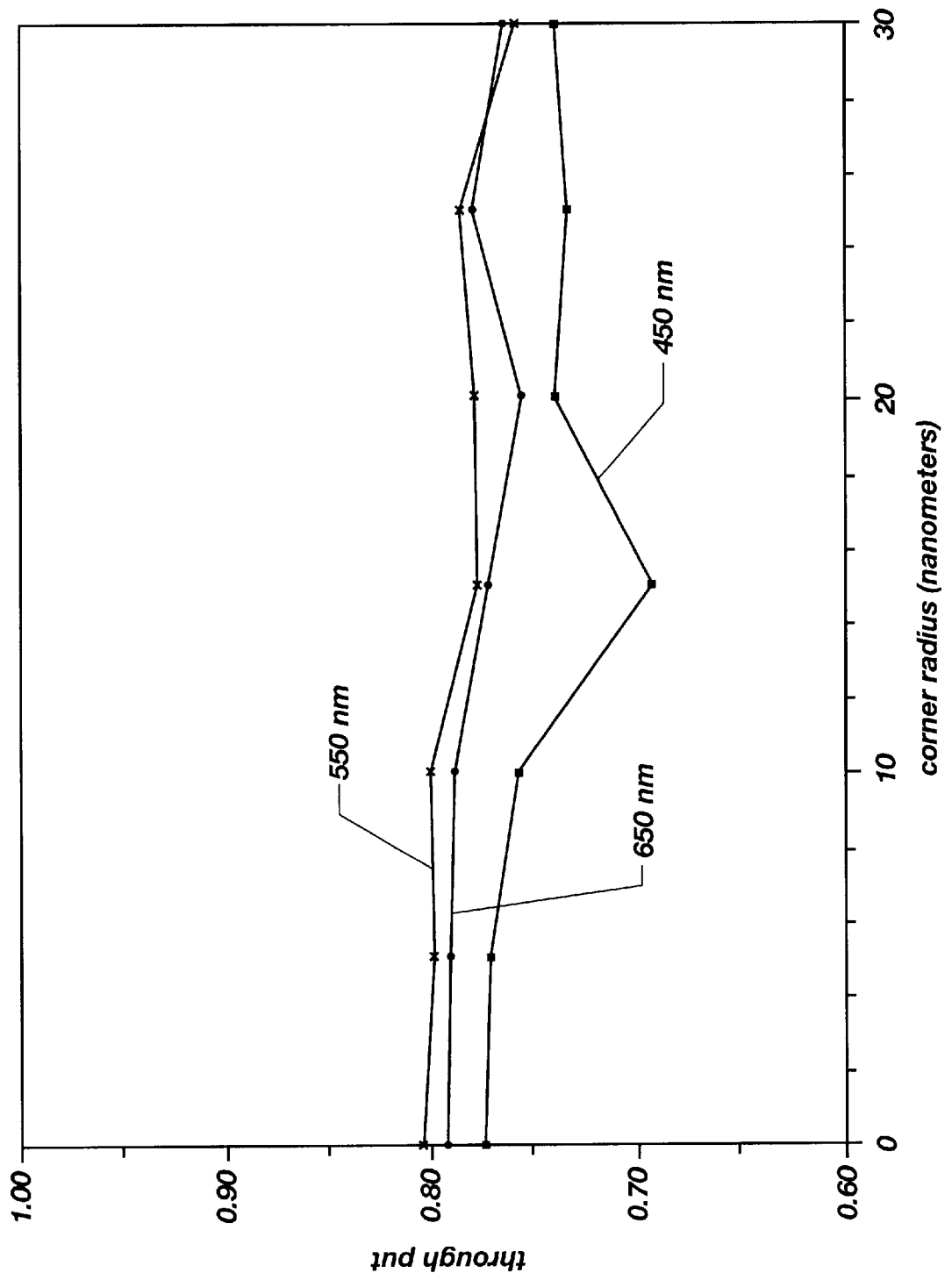
FIG. 7a is a graphical plot showing the throughput ($R_s T_p$) as a function of the upper corner radius for the grid elements at 450 nm, 550 nm, and 650 nm.
Figure 7B:
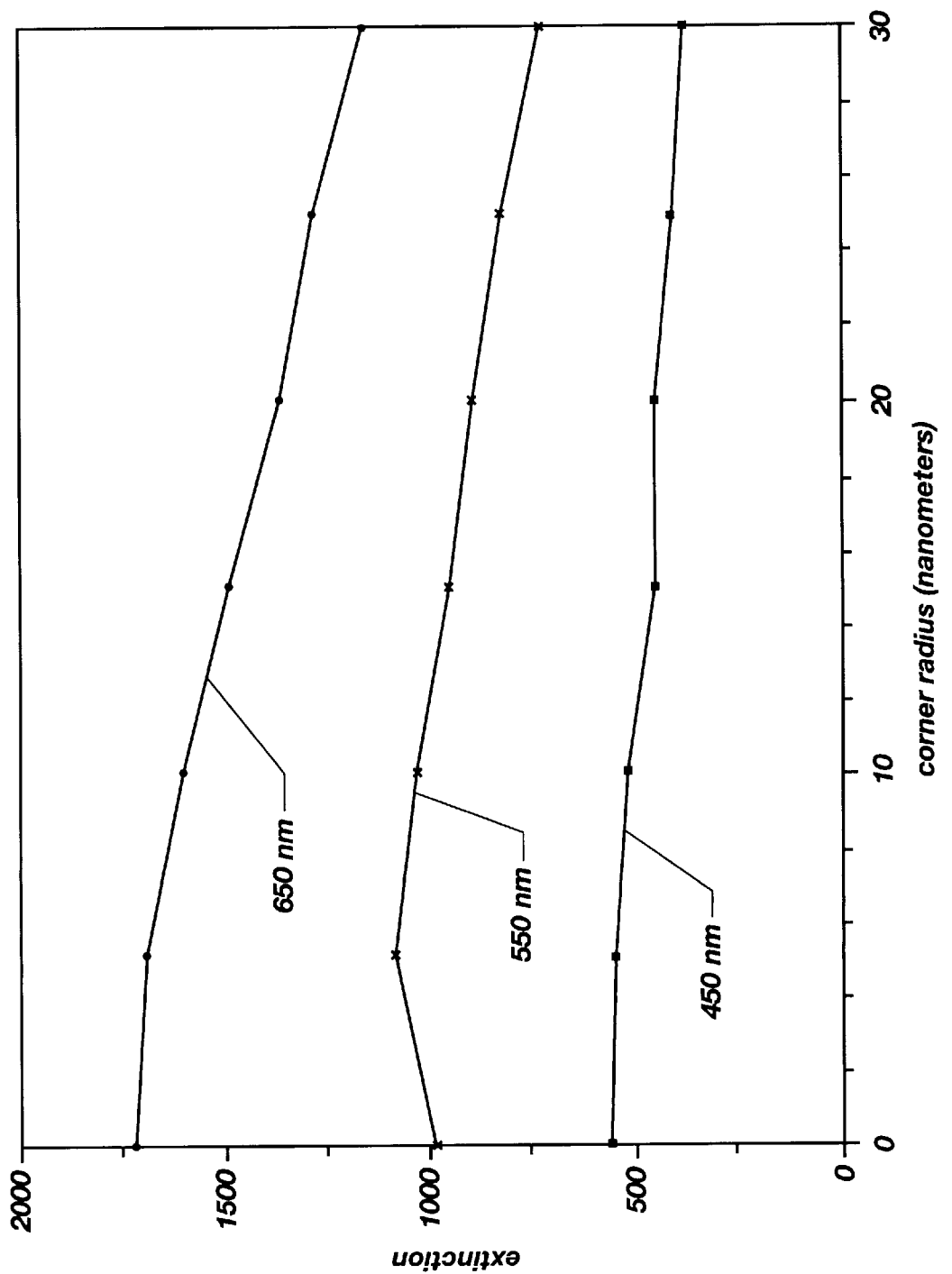
FIG. 7b is a graphical plot showing the extinction as a function of the upper corner radius for the grid elements at 450 nm, 550 nm, and 650 nm.

Referring now to FIGS. 7a and 7b, the performance of the wire grid beam splitter 14 is shown with respect to the radius $r_c$ of the corners 50. The polarizer is an array of aluminum wire grid elements with optical properties taken from Palik on a 1737F glass substrate. The period p is 0.16 µm, the aluminum element height t is 0.115 µm, and the angle of incidence θ is 45°.

FIG. 7a shows throughput ($R_s T_p$) as a function of corner radius for wavelengths of 450 nm, 550 nm, and 650 nm. Good throughput performance, i.e. greater than 50%, is achieved for all radii.

FIG. 7b gives extinction as a function of corner radius for wavelengths of 450 nm, 550 nm, and 650 nm. An extinction greater than 100 is possible for all corner radii.

Figure 7C:
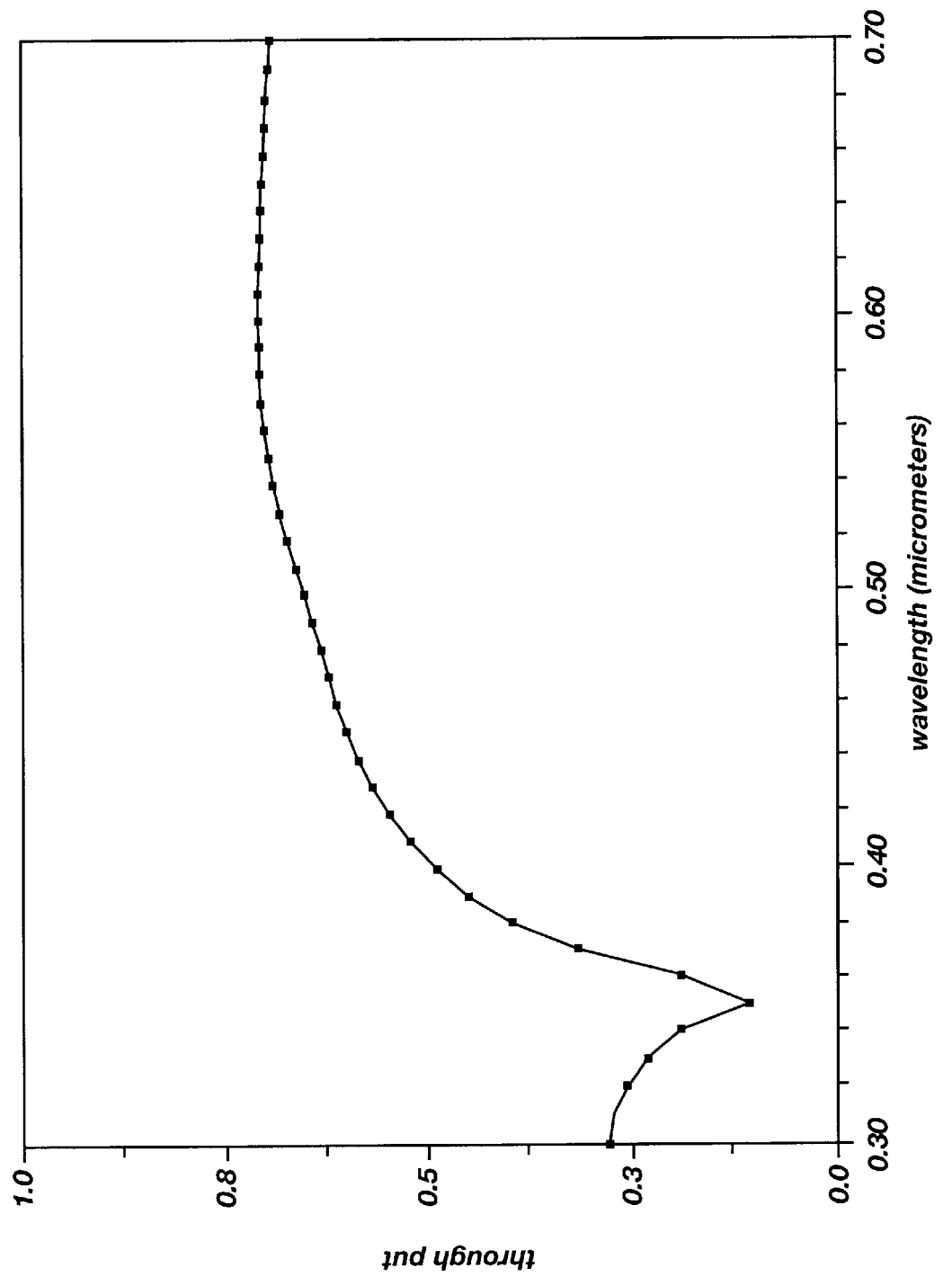
FIG. 7c is a graphical plot showing the throughput ($R_s T_p$) as a function of wavelength for a grid with elements of sinusoidal cross-section.
Figure 7D:
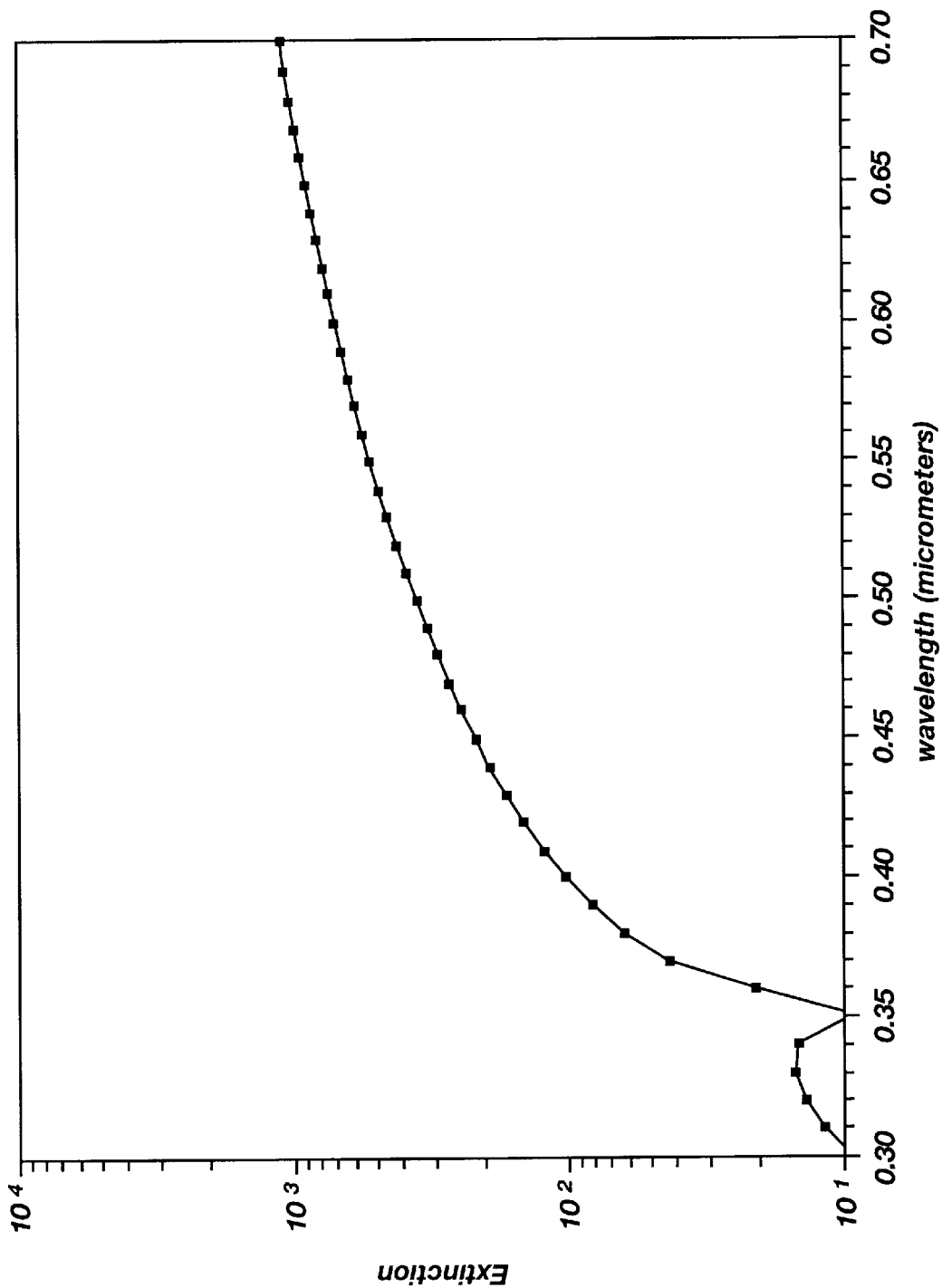
FIG. 7d is a graphical plot showing the extinction as a function of wavelength for a grid with elements of sinusoidal cross-section.

Referring now to FIGS. 7c and 7d, the performance of the wire grid beam splitter 14 is shown with respect to the cross sectional shape of the elements, namely a sinusoidal cross-section. The polarizer is an array of aluminum wire grid elements with optical properties taken from Palik on a BK7 glass substrate. The wire grid elements have a sinusoidal cross-section with a height t of 0.15 µm. The other parameters are the same as used for 7a, and 7b.

FIG. 7c shows throughput ($R_s T_p$) as a function of wavelength λ for the sinusoidal cross-section. Good throughput performance, i.e. greater than 50%, is achieved for wavelengths greater than 400 nm.

FIG. 7d gives extinction as a function of wavelength λ for the sinusoidal cross-section. An extinction greater than 50 is possible for wavelengths greater than 400 nm.

Therefore, FIGS. 7a–7d show that the corners of the wire grid element may be rounded, and may even be sinusoidal, if desired, or for ease of manufacture, etc.

The above information has defined in broad terms what the required ranges are for all the parameters of the wire grid beam splitter 14, but it has not defined ways in which these parameters are chosen together to achieve the desired beam splitter performance. The issues of concern are to balance the color performance over angle, the transmission over angle, the extinction over angle, etc. In addition to the broad ranges given above, it is also important to choose what particular parameters from the ranges defined are appropriate for particular applications, and to define some general rules governing how these parameters are chosen.

Referring to FIGS. 8a–8d, a design example is illustrated. The goal is to produce a wire grid polarizing beam splitter that works over an angle of incidence θ ranging from 30° to 60° with a roughly flat response over the visible wavelengths, 450 nm to 650 nm, with an extinction of at least 200 and efficiency or throughput of at least 70%. The design is done by iteration. First, P-transmission as a function of wire grid element height t is calculated for angles of incidence of 30° and 60° using a wavelength of 450 nm. The short wavelength of 450 nm will give the worst case, while longer wavelengths will give better results. From FIG. 5b it is clear that a selection of 0.5 for the width to period ratio will be close to optimum, and that the period should be as small as practical considering other issues such as cost and manufacturing yield. The two calculations are plotted on the same graph. The wire grid element height t at which the two curves cross is found. The extinction as a function of wire grid element height t is now calculated for both angles, and the extinction at the crossover height t is found. If the performance is not satisfactory, one of the critical parameters is changed and the design process repeated. To find the best design, response surface methods, such as those described in A. I. Khuri and J. A. Cornell, *Response Surfaces: Design and Analysis*, $2^{nd}$ Ed., Marcel Dekker Inc., NY 1996, may be calculated. When extinction performance is satisfactory, the P-transmission as a function of angle of incidence θ is calculated for three different wavelengths 450 nm, 550 nm, and 650 nm. If the transmission is around 80% and fairly flat across the specified angular range, then the design is complete.

Figure 8A:
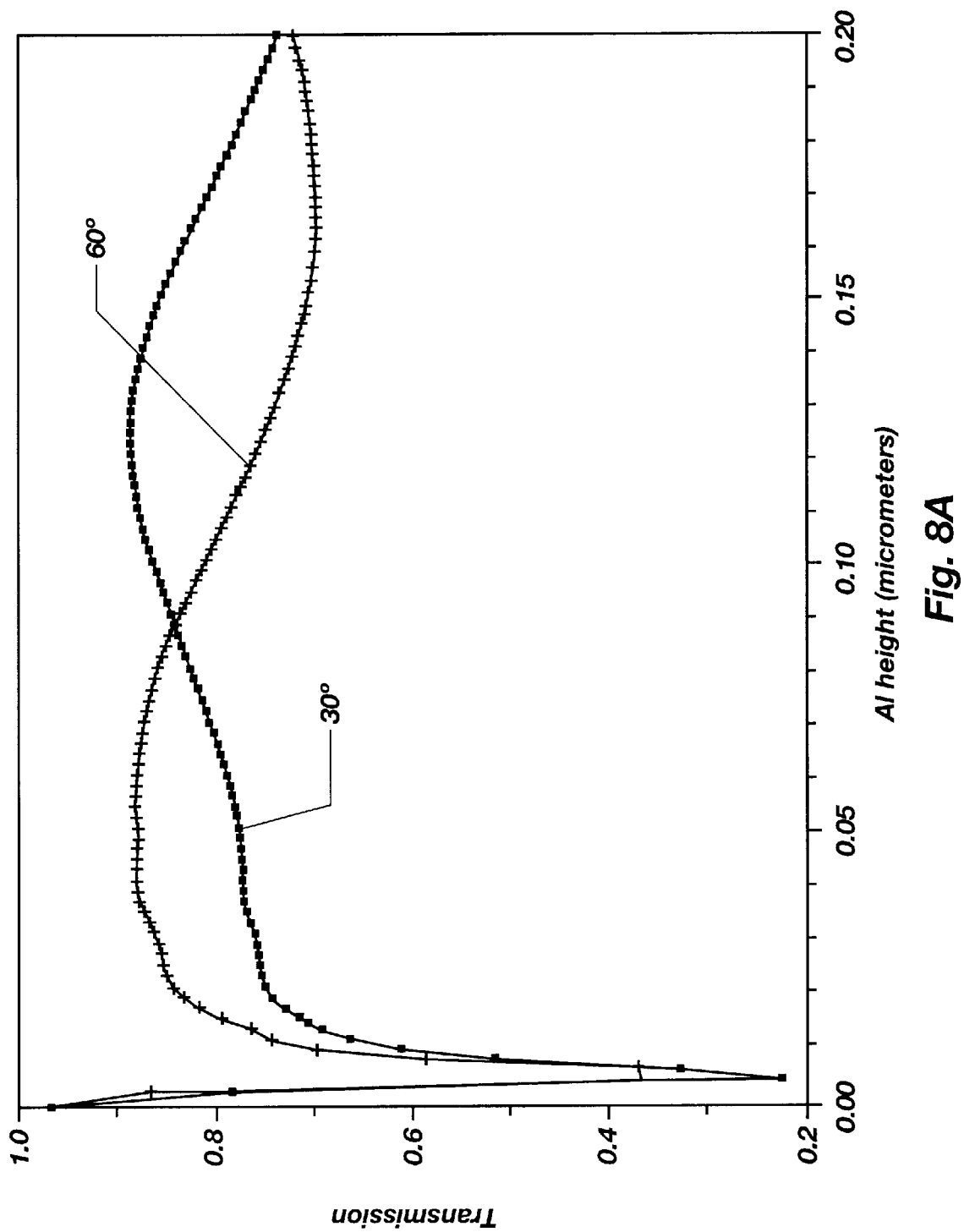
FIG. 8a is a graphical plot of P polarization transmission at incident angles of 30° and 60° as a function of the grid element height.

For example, FIG. 8a shows P-transmission as a function of wire grid element height t for a polarizer which is an array of aluminum wire grid elements with optical properties taken from Palik on a BK7 glass substrate. The period p is 0.16 μm, the linewidth to period ration is 0.45, the angle of incidence θ is 30° and 60°, and the wavelength λ is 450 nm. The crossover is about 0.09 μm.

Figure 8B:
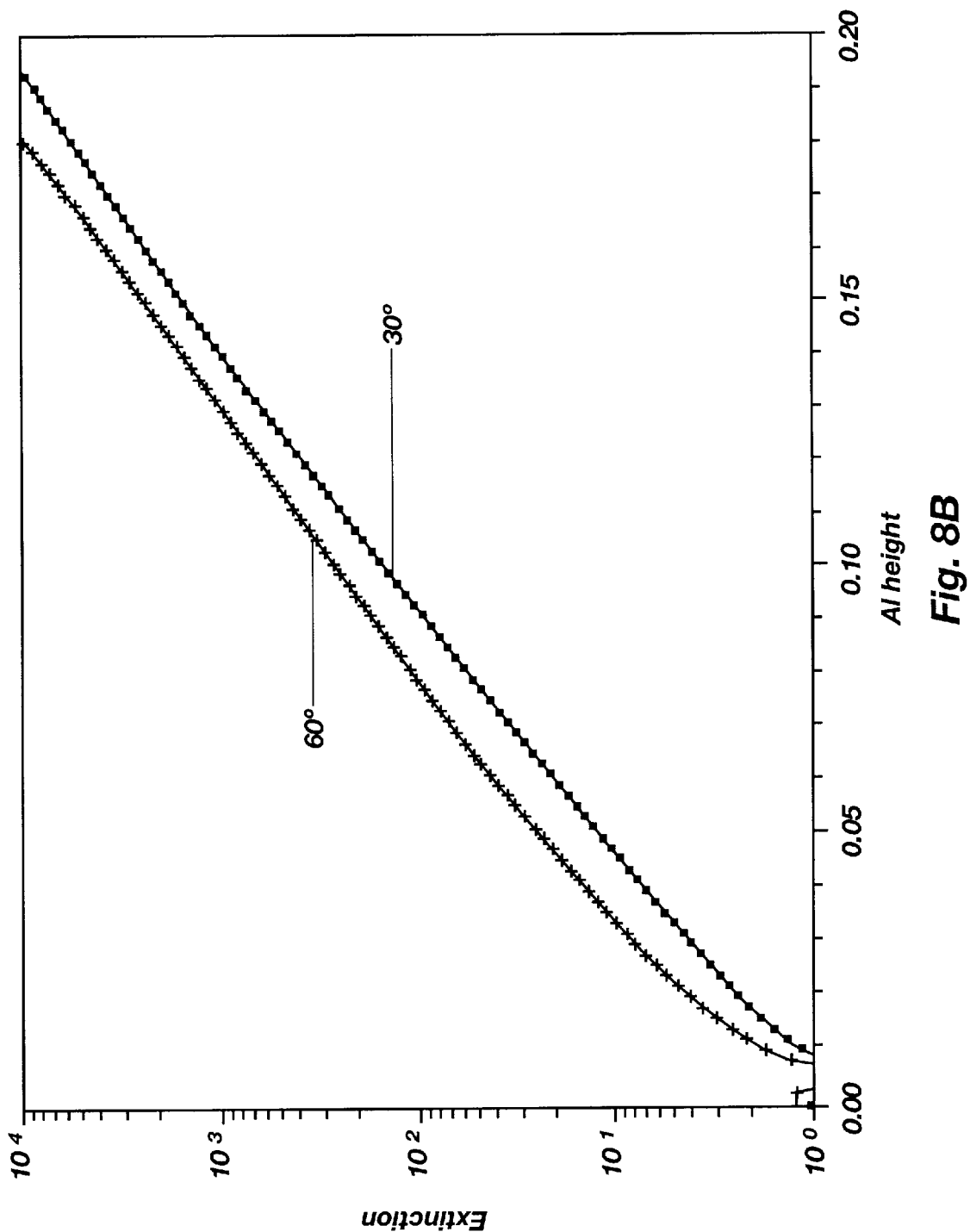
FIG. 8b is a graphical plot of transmission extinction at incident angles of 30° and 60° as a function of the grid element height.

FIG. 8b shows extinction as a function of wire grid element height t for these parameters. At the crossover value of 0.09 μm, the extinction is 86 and 161, respectively, at 30° and 60°. Thus, the performance is not satisfactory. The process is repeated with a line-space ratio of 0.50.

Figure 8C:
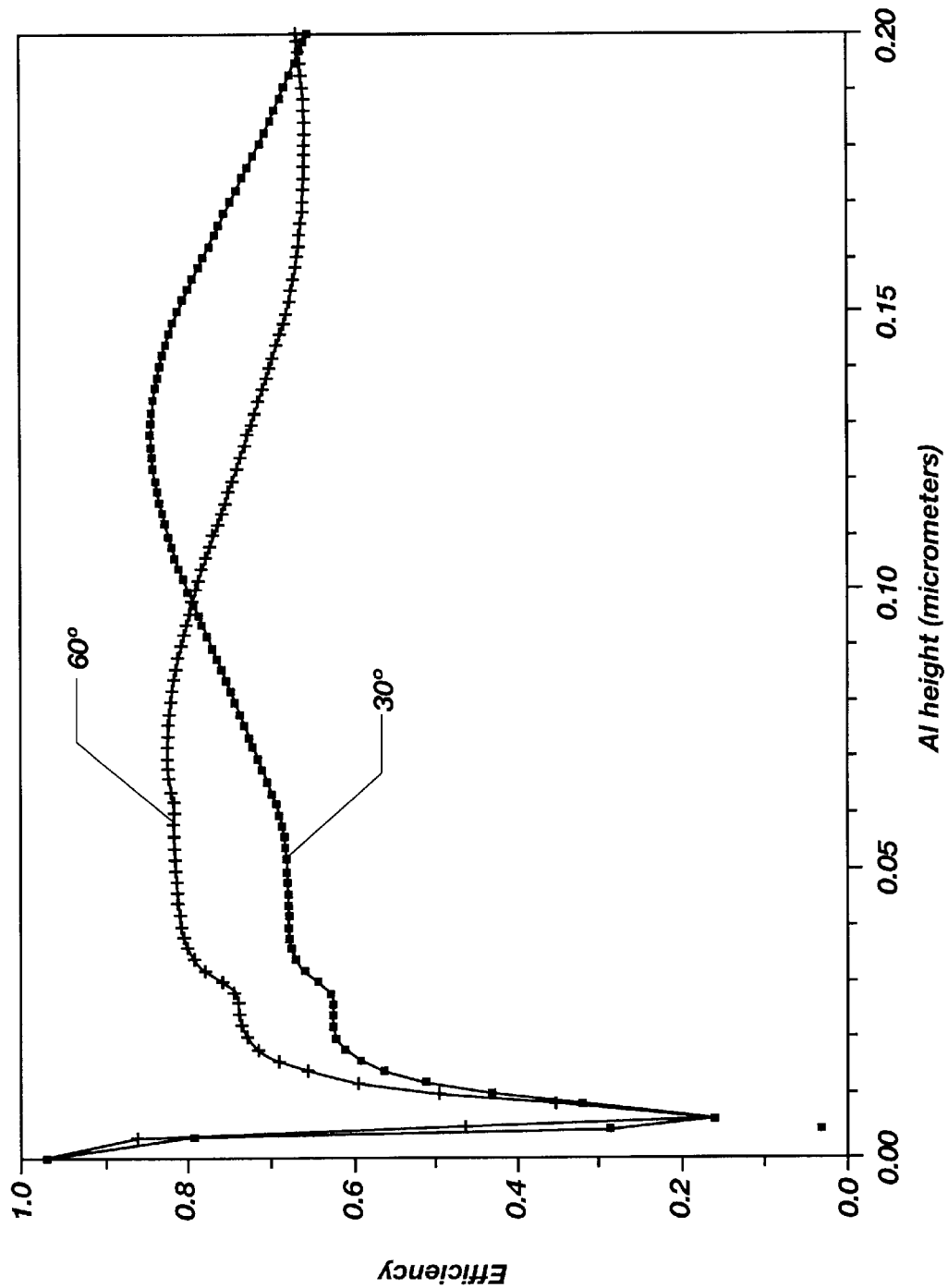
FIG. 8c is a graphical plot of P polarization transmission at incident angles of 30° and 60° as a function of the grid element height.

FIG. 8c is the same as FIG. 8a, except that the line-space ratio is changed to 0.5. The crossover is now about 0.10 μm.

Figure 8D:
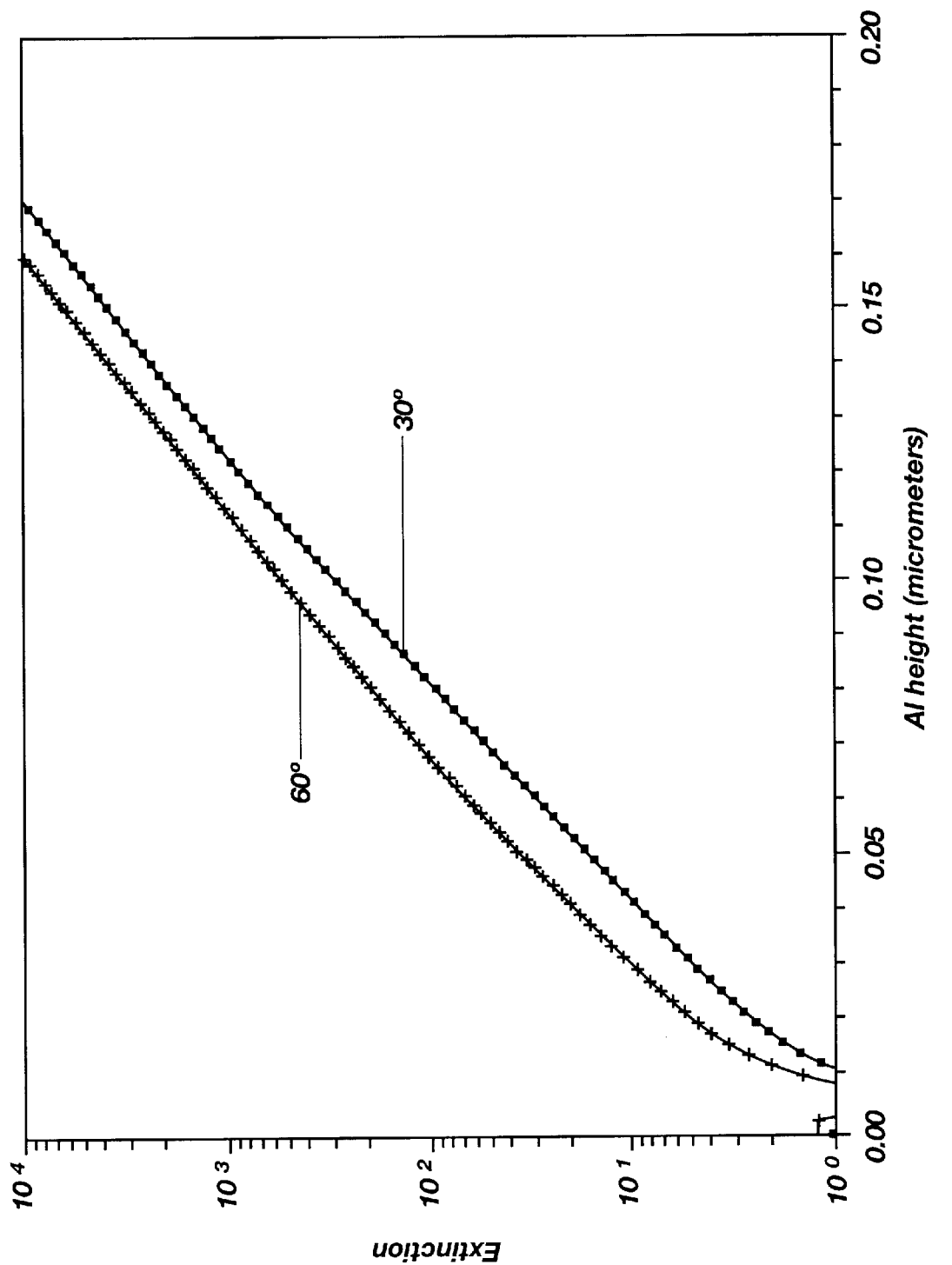
FIG. 8d is a graphical plot of transmission extinction at incident angles of 30° and 60° as a function of the grid element height.
Figure 8E:
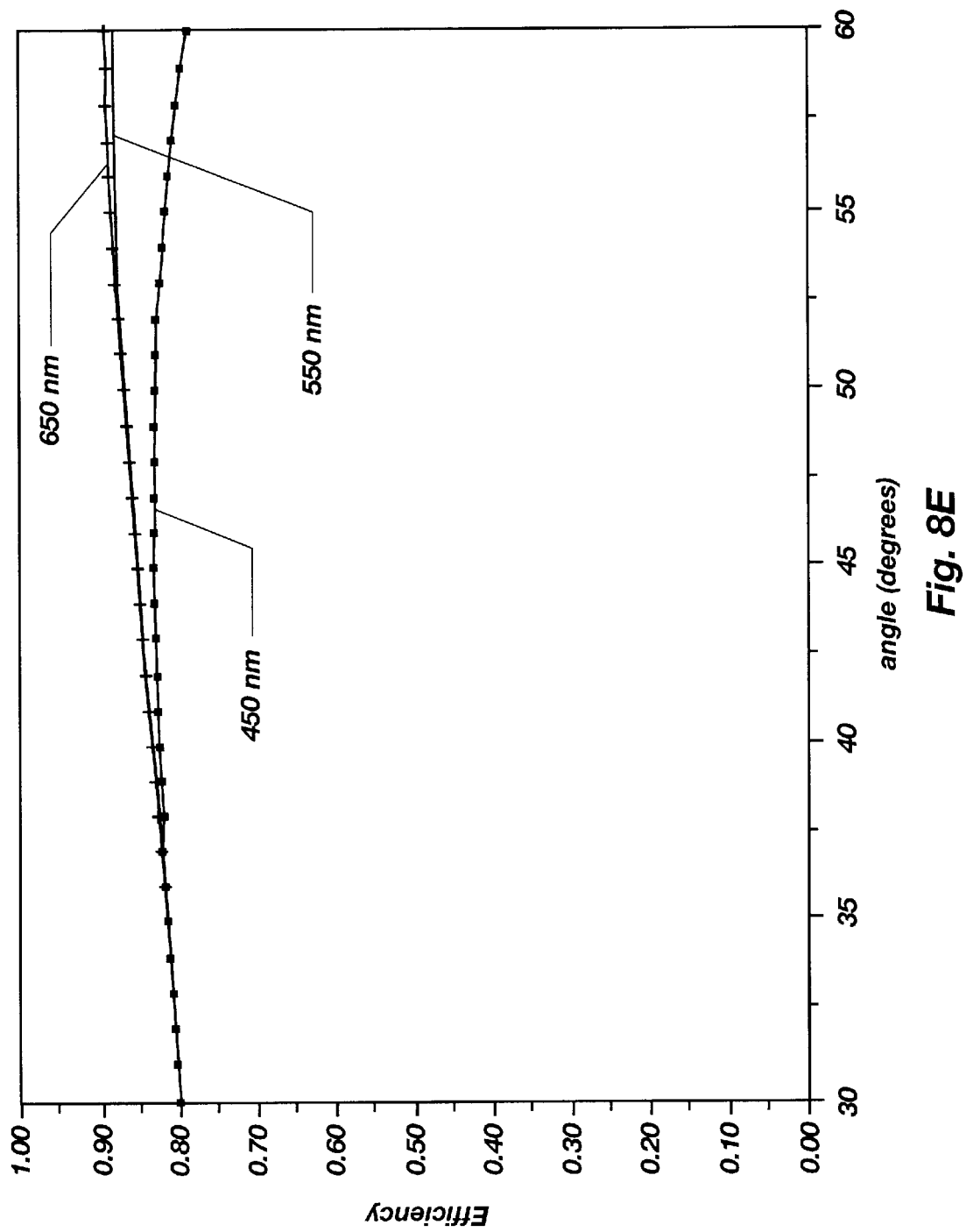
FIG. 8e is a graphical plot of P polarization transmission of the optimized design.

FIG. 8d shows extinction as a function of wire grid element height t for the parameters used in FIG. 8c. At the crossover value of 0.10 μm, the extinction is 258 and 484, respectively, at 30° and 60°. Thus, the performance of the polarizer is satisfactory. The results are now checked by calculating the P-transmission as a function of angle of incidence θ for three different wavelengths λ, 450 nm, 550 nm, and 650 nm, using the same parameters used in FIGS. 8c and 8d with a wire grid element height t of 0.100 μm, as shown in FIG. 8e. The transmission is flat over the angular range for 450 nm, while at 550 nm and 650 nm the transmission rises from 80% at 30° to 88% at 60°.

Although efficiency is not shown, it will rise as the angle increases. Thus, referring to FIGS. 8a–8e, a demonstration of a method for designing a wire grid polarizer that has good performance in the visible spectrum is illustrated.

It is to be understood that the described embodiments of the invention are illustrative only, and that modifications thereof may occur to those skilled in the art. For example, the inclusion of the wire grid beam splitter on a substrate with optical power, such that the grid beam splitter is combined with other elements to shrink the number of optics required, reduce the system weight, the system volume, or to achieve other desirable functions. Other alterations will surely occur to those skilled in the art given the significant increase in design flexibility over the prior art that is achieved by the present invention. Accordingly, this invention is not to be regarded as limited to the embodiments disclosed, but is to be limited only as defined by the appended claims herein.

What is claimed is:

1. A broad band wire grid polarizing beam splitter for efficiently reflecting one polarization of visible light and transmitting another polarization, the beam splitter comprising:

a generally parallel arrangement of thin, elongated elements disposed in the visible light, the arrangement being configured and the elements being sized to interact with electromagnetic waves of the visible light to generally (i) transmit light having a polarization oriented perpendicular to a plane that includes at least one of the elements and the direction of the incident light beam, and (ii) reflect light having a polarization oriented in the plane that includes at least one of the elements and the direction of the incident light beam; and wherein the arrangement of elements has a throughput greater than approximately 50% over substantially the entire visible spectrum, the throughput being defined by the product of the fractional amount of one polarization of reflected light with respect to the total reflected light and the fractional amount of another polarization of transmitted light with respect to the total transmitted light; and wherein the arrangement of elements has an extinction greater than approximately 50 in either reflection or transmission.

2. The beam splitter of claim 1, wherein the arrangement of elements reflects at least 67% of one polarization.

3. The beam splitter of claim 1, wherein the arrangement of elements transmits at least 67% of one polarization.

4. The beam splitter of claim 1, wherein the arrangement of elements is oriented at an incident angle between approximately 0 to 80 degrees.

5. The beam splitter of claim 1, wherein the arrangement of elements has a period less than approximately 0.21 μm.

6. The beam splitter of claim 1, wherein the elements have a thickness of between approximately 0.05 to 0.5 μm.

7. The beam splitter of claim 1, wherein the elements have a width to period ratio of between approximately 0.25 to 0.76.

8. The beam splitter of claim 1, wherein the elements each have a trapezoidal-shaped cross-section with a base, a top opposite the base, and opposite left and right sides; and wherein the sides form an angle with respect to the base of between approximately 68 to 112 degrees.

9. The beam splitter of claim 1, wherein the elements each have a trapezoidal-shaped cross-section with a base, a top opposite the base, and opposite left and right sides; and wherein the sides form different angles with respect to the base.

10. The beam splitter of claim 1, wherein the elements each have a rounded top.

11. The beam splitter of claim 1, wherein the elements each have a sinusoidal-shaped cross-section.

12. The beam splitter of claim 1, wherein the elements are formed of aluminum having optical constant n which is greater than approximately 50 percent of 0.618 at a wavelength of 450 nm, greater than approximately 50 percent of 0.958 at a wavelength of 550 nm, and greater than approximately 50 percent of 1.47 at a wavelength of 650 nm.

13. The beam splitter of claim 1, wherein the elements are formed of aluminum having optical constant k which is greater than approximately 50 percent of 5.47 at a wavelength of 450 nm, greater than approximately 50 percent of 6.69 at a wavelength of 550 nm, and greater than approximately 50 percent of 7.79 at a wavelength of 650 nm.

14. The beam splitter of claim 1, wherein the elements are formed of silver having optical constant n which is greater than approximately 80 percent of 0.144 at a wavelength of 459.2 nm, greater than approximately 80 percent of 0.120 at a wavelength of 563.6 nm, and greater than approximately 80 percent of 0.140 at a wavelength of 652.6 nm.

15. The beam splitter of claim 1, wherein the elements are formed of silver having optical constant k which is greater than approximately 80 percent of 2.56 at a wavelength of 459.2 nm, greater than approximately 80 percent of 3.45 at a wavelength of 563.6 nm, and greater than approximately 80 percent of 4.15 at a wavelength of 652.6 nm.

16. A broad band wire grid polarizing beam splitter for efficiently reflecting one polarization of visible light and transmitting another polarization, the beam splitter comprising:

a generally parallel arrangement of thin, elongated elements disposed in the visible light, the arrangement being configured and the elements being sized to interact with electromagnetic waves of the visible light to generally (i) transmit light having a polarization oriented perpendicular to a plane that includes at least one of the elements and the direction of the incident light beam, and (ii) reflect light having a polarization oriented in the plane that includes at least one of the elements and the direction of the incident light beam; and wherein the arrangement of elements has a throughput greater than approximately 50% over substantially the entire visible spectrum, the throughput being defined by the product of the fractional amount of one polarization of reflected light with respect to the total amount of reflected light and the fractional amount of another polarization of transmitted light with respect to the total amount of transmitted light;

wherein the arrangement of elements has an extinction greater than approximately 50; and wherein the arrangement of elements has a period less than approximately 0.21 $\mu$m.

17. The beam splitter of claim 16, wherein the elements have a thickness of between approximately 0.05 to 0.5 $\mu$m.

18. The beam splitter of claim 16, wherein the elements have a width to period ratio of between approximately 0.25 to 0.76.

19. The beam splitter of claim 16, wherein the arrangement of elements reflects at least 67% of one polarization.

20. The beam splitter of claim 16, wherein the arrangement of elements transmits at least 67% of one polarization.

21. The beam splitter of claim 16, wherein the arrangement of elements are oriented at an incident angle between approximately 0 to 80 degrees.

22. The beam splitter of claim 16, wherein the elements each have a trapezoidal-shaped cross-section with a base, a top opposite the base, and opposite left and right sides; and wherein the sides form an angle with respect to the base of between approximately 68 to 112 degrees.

23. The beam splitter of claim 16, wherein the elements each have a trapezoidal-shaped cross-section with a base, a top opposite the base, and opposite left and right sides; and wherein the sides form different angles with respect to the base.

24. The beam splitter of claim 16, wherein the elements each have a rounded top.

25. The beam splitter of claim 16, wherein the elements each have a sinusoidal-shaped cross-section.

26. The beam splitter of claim 16, wherein the elements are formed of aluminum having optical constant n which is greater than approximately 50 percent of 0.618 at a wavelength of 450 nm, greater than approximately 50 percent of 0.958 at a wavelength of 550 nm, and greater than approximately 50 percent of 1.47 at a wavelength of 650 nm.

27. The beam splitter of claim 16, wherein the elements are formed of aluminum having optical constant k which is greater than approximately 50 percent of 5.47 at a wavelength of 450 nm, greater than approximately 50 percent of 6.69 at a wavelength of 550 nm, and greater than approximately 50 percent of 7.79 at a wavelength of 650 nm.

28. The beam splitter of claim 16, wherein the elements are formed of silver having optical constants n and k; wherein n is greater than approximately 80 percent of 0.144 at a wavelength of 459.2 nm, greater than approximately 80 percent of 0.120 at a wavelength of 563.6 nm, and greater than approximately 80 percent of 0.140 at a wavelength of 652.6 nm; and wherein k is greater than approximately 80 percent of 2.56 at a wavelength of 459.2 nm, greater than approximately 80 percent of 3.45 at a wavelength of 563.6 nm, and greater than approximately 80 percent of 4.15 at a wavelength of 652.6 nm.

29. A broad band wire grid polarizing beam splitter for efficiently reflecting one polarization of visible light and transmitting another polarization, the beam splitter comprising:

a light source for emitting a source light beam having a wavelength in a range between approximately 0.4 to 0.7 microns;

a generally parallel arrangement of thin, elongated elements disposed in the source light beam, the arrangement being configured and the elements being sized to interact with electromagnetic waves of the source light beam over substantially the entire visible spectrum to generally (i) transmit light having a polarization oriented perpendicular to a plane that includes at least one of the elements and the direction of the incident light beam, and (ii) reflect light having a polarization oriented in the plane that includes at least one of the elements and the direction of the incident light beam; and wherein the arrangement of elements has a period less than approximately 0.21 $\mu$m;

wherein the elements have a thickness of between approximately 0.05 to 0.5 $\mu$m; and wherein the elements have a width to period ratio of between approximately 0.25 to 0.76.

30. The beam splitter of claim 29, wherein the arrangement of elements has a throughput greater than approximately 50% over substantially the entire visible spectrum, the throughput being defined by the fractional amount of the percent of one polarization of reflected light with respect to the total amount of reflected light and the fractional amount of another polarization of transmitted light with respect to the total amount of transmitted light; and wherein the arrangement of elements has an extinction greater than approximately 50.

31. The beam splitter of claim 29, wherein the arrangement of elements reflects at least 67% of one polarization.

32. The beam splitter of claim 29, wherein the arrangement of elements transmits at least 67% of one polarization.

33. The beam splitter of claim 29, wherein the arrangement of elements are oriented at an incident angle between approximately 0 to 80 degrees.

34. The beam splitter of claim 29, wherein the elements each have a trapezoidal-shaped cross-section with a base, a top opposite the base, and opposite left and right sides; and wherein the sides form an angle with respect to the base of between approximately 68 to 112 degrees.

35. The beam splitter of claim 29, wherein the elements each have a trapezoidal-shaped cross-section with a base, a top opposite the base, and opposite left and right sides; and wherein the sides form different angles with respect to the base.

36. The beam splitter of claim 29, wherein the elements each have a rounded top.

37. The beam splitter of claim 29, wherein the elements each have a sinusoidal-shaped cross-section.

38. The beam splitter of claim 29, wherein the elements are formed of aluminum having optical constants n and k; wherein n is greater than approximately 50 percent of 0.618 at a wavelength of 450 nm, greater than approximately 50 percent of 0.958 at a wavelength of 550 nm, and greater than approximately 50 percent of 1.47 at a wavelength of 650 nm; and wherein k is greater than approximately 50 percent of 5.47 at a wavelength of 450 nm, greater than approximately 50 percent of 6.69 at a wavelength of 550 nm, and greater than approximately 50 percent of 7.79 at a wavelength of 650 nm.

39. The beam splitter of claim 29, wherein the elements are formed of silver having optical constant n which is greater than approximately 80 percent of 0.144 at a wavelength of 459.2 nm, greater than approximately 80 percent of 0.120 at a wavelength of 563.6 nm, and greater than approximately 80 percent of 0.140 at a wavelength of 652.6 nm.

40. The beam splitter of claim 29, wherein the elements are formed of silver having optical constant k which is greater than approximately 80 percent of 2.56 at a wavelength of 459.2 nm, greater than approximately 80 percent of 3.45 at a wavelength of 563.6 nm, and greater than approximately 80 percent of 4.15 at a wavelength of 652.6 nm.

41. A method for designing a broad band wire grid polarizing beam splitter operable over a desired range of incidence angles and operable over substantially the entire visible spectrum and having a predetermined extinction, the method comprising:

determining the transmission efficiency for the predetermined upper and lower limits of the incidence angles at various element thicknesses using a lower limit of the visible spectrum;

selecting other parameters including at least the period and the width to period ratio;

determining the element thickness at which the transmission efficiency for the upper and lower limits of the incidence angles is the same;

determining the extinction for the determined element thickness at both the upper and lower limits of the incidence angles; and repeating the above steps while varying at least one of the parameters until the predetermined extinction is reached.

42. The method of claim 41, further comprising:

determining the transmission efficiency for various different incidence angles within the desired range and for various wavelengths within the visible spectrum; and repeating the above steps while varying at least one of the parameters until the transmission efficiency is at least 80% and generally similar over the visible spectrum.

43. A wire grid polarizing beam splitter, comprising:

a generally parallel arrangement of thin, elongated elements configured to be disposed in visible light, the arrangement being configured and the elements being sized to interact with electromagnetic waves of visible light to generally (i) transmit light having a polarization oriented perpendicular to a plane that includes at least one of the elements and the direction of the incident light beam, and (ii) reflect light having a polarization oriented in the plane that includes at least one of the elements and the direction of the incident light beam; and wherein the arrangement of elements has a throughput greater than approximately 50% defined by the product of the fractional amount of one polarization of reflected light with respect to the total reflected light and the fractional amount of another polarization of transmitted light with respect to the total transmitted light; and wherein the arrangement of elements has an extinction greater than approximately 50 in either reflection or transmission; and wherein at least some of the elements have a trapezoidal-shaped cross-section with a base, a top opposite the base, and opposite left and right sides; and wherein the sides form different angles with respect to the base.

44. A wire grid polarizing beam splitter, comprising:

a generally parallel arrangement of thin, elongated elements configured to be disposed in visible light, the arrangement being configured and the elements being sized to interact with electromagnetic waves of visible light to generally (i) transmit light having a polarization oriented perpendicular to a plane that includes at least one of the elements and the direction of the incident light beam, and (ii) reflect light having a polarization oriented in the plane that includes at least one of the elements and the direction of the incident light beam; and wherein the arrangement of elements has a throughput greater than approximately 50% defined by the product of the fractional amount of one polarization of reflected light with respect to the total reflected light and the fractional amount of another polarization of transmitted light with respect to the total transmitted light; and wherein the arrangement of elements has an extinction greater than approximately 50 in either reflection or transmission; and wherein at least some of the elements have a rounded top.

45. A wire grid polarizing beam splitter, comprising:

a generally parallel arrangement of thin, elongated elements configured to be disposed in visible light, the arrangement being configured and the elements being sized to interact with electromagnetic waves of visible light to generally (i) transmit light having a polarization oriented perpendicular to a plane that includes at least one of the elements and the direction of the incident light beam, and (ii) reflect light having a polarization oriented in the plane that includes at least one of the elements and the direction of the incident light beam; and wherein the arrangement of elements has a throughput greater than approximately 50% defined by the product of the fractional amount of one polarization of reflected light with respect to the total reflected light and the fractional amount of another polarization of transmitted light with respect to the total transmitted light; and wherein the arrangement of elements has an extinction greater than approximately 50 in either reflection or transmission; and wherein at least some of the elements have a sinusoidal-shaped cross-section.

46. A wire grid polarizing beam splitter, comprising:

a generally parallel arrangement of thin, elongated elements configured to be disposed in visible light, the arrangement being configured and the elements being sized to interact with electromagnetic waves of visible light to generally (i) transmit light having a polarization oriented perpendicular to a plane that includes at least one of the elements and the direction of the incident light beam, and (ii) reflect light having a polarization oriented in the plane that includes at least one of the elements and the direction of the incident light beam; and wherein the arrangement of elements has a throughput greater than approximately 50% defined by the product of the fractional amount of one polarization of reflected light with respect to the total reflected light and the fractional amount of another polarization of transmitted light with respect to the total transmitted light; and wherein the arrangement of elements has an extinction greater than approximately 50 in either reflection or transmission; and wherein the elements are formed of silver having optical constant n which is greater than approximately 80 percent of 0.144 at a wavelength of 459.2 nm, greater than approximately 80 percent of 0.120 at a wavelength of 563.6 nm, and greater than approximately 80 percent of 0.140 at a wavelength of 652.6 nm; and wherein the elements are formed of silver having optical constant k which is greater than approximately 80 percent of 2.56 at a wavelength of 459.2 nm, greater than approximately 80 percent of 3.45 at a wavelength of 563.6 nm, and greater than approximately 80 percent of 4.15 at a wavelength of 652.6 nm.

\* \* \* \* \*